US012418376B2

(12) United States Patent
Tanaka et al.

(10) Patent No.: US 12,418,376 B2
(45) Date of Patent: Sep. 16, 2025

(54) WIRELESS BASE STATION AND WIRELESS TERMINAL

(71) Applicant: SONY GROUP CORPORATION, Tokyo (JP)

(72) Inventors: Ken Tanaka, Tokyo (JP); Kosuke Aio, Tokyo (JP); Shigeru Sugaya, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 388 days.

(21) Appl. No.: 17/905,053

(22) PCT Filed: Jan. 17, 2021

(86) PCT No.: PCT/JP2021/000312
§ 371 (c)(1),
(2) Date: Aug. 25, 2022

(87) PCT Pub. No.: WO2021/176836
PCT Pub. Date: Sep. 10, 2021

(65) Prior Publication Data
US 2023/0216634 A1 Jul. 6, 2023

(30) Foreign Application Priority Data

Mar. 4, 2020 (JP) ................ 2020-036687

(51) Int. Cl.
H04L 5/00 (2006.01)
H04B 7/024 (2017.01)
H04B 17/336 (2015.01)

(52) U.S. Cl.
CPC ........... H04L 5/0051 (2013.01); H04B 7/024 (2013.01); H04B 17/336 (2015.01)

(58) Field of Classification Search
CPC ... H04W 28/04; H04W 72/04; H04W 72/042; H04W 88/08; H04L 5/0007; H04L 5/0051; H04B 17/336; H04B 7/024
(Continued)

(56) References Cited

U.S. PATENT DOCUMENTS 8,855,026 B2 * 10/2014 Maattanen ............ H04W 24/10
370/278
10,009,736 B1 * 6/2018 Chu ....................... H04W 12/03
(Continued)

FOREIGN PATENT DOCUMENTS

JP 2012-034053 A * 2/2012 ............ H04W 72/04
JP 2013-232666 A * 6/2013 ......... H01L 21/8238
(Continued)

OTHER PUBLICATIONS

Multi-AP Collaborative BF in IEEE 802.11, May 2019, doc: IEEE 802.11-19/0772r1. Intel Corporation. (Year: 2019).*
(Continued)

Primary Examiner — Peter G Solinsky
Assistant Examiner — Sanjay K Dewan
(74) Attorney, Agent, or Firm — CHIP LAW GROUP

(57) ABSTRACT

Interference with another terminal caused by joint transmission of a plurality of wireless base stations is appropriately estimated. A wireless base station includes a wireless control section and a communication section. The wireless control section, when performing joint transmission with a joint wireless base station, generates a reference signal for estimating interference given to a wireless terminal connected to another wireless base station, and determines a setting regarding joint transmission in accordance with a result of estimation of interference based on the reference signal. The communication section transmits a reference signal to another wireless base station or a wireless terminal, and
(Continued)

announces, to a joint wireless base station, a setting regarding joint transmission.

19 Claims, 20 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 11,696,354 B2* | 7/2023 | Ryu | ................... | H04W 74/002 |
| | | | | 370/329 |
| 2007/0086370 A1* | 4/2007 | Jang | ..................... | H04L 1/1887 |
| | | | | 370/329 |
| 2013/0250876 A1* | 9/2013 | Hugl | ..................... | H04B 7/0639 |
| | | | | 370/329 |
| 2013/0301450 A1* | 11/2013 | Geirhofer | ............. | H04B 7/024 |
| | | | | 370/252 |
| 2013/0322376 A1* | 12/2013 | Marinier | ............... | H04L 1/0027 |
| | | | | 370/329 |
| 2015/0009964 A1* | 1/2015 | Ellenbeck | ........... | H04W 72/541 |
| | | | | 370/336 |
| 2015/0163769 A1* | 6/2015 | Lee | ...................... | H04W 24/02 |
| | | | | 370/329 |
| 2015/0195071 A1* | 7/2015 | Lunttila | ............ | H04L 25/03904 |
| | | | | 370/329 |
| 2015/0200754 A1* | 7/2015 | Sayana | ................. | H04L 5/0053 |
| | | | | 370/328 |
| 2015/0282044 A1* | 10/2015 | Balasubramanian | ........................ | |
| | | | | H04W 52/0203 |
| | | | | 370/329 |
| 2017/0064713 A1* | 3/2017 | Barriac | ................... | H04L 69/22 |
| 2018/0263044 A1 | 9/2018 | Zhou | | |
| 2019/0081664 A1* | 3/2019 | Vermani | ............... | H04L 5/0035 |
| 2020/0245166 A1 | 7/2020 | Kwak | | |
| 2021/0067214 A1* | 3/2021 | Vermani | ............. | H04B 7/0691 |
| 2021/0143884 A1* | 5/2021 | Kwon | ............... | H04W 74/0816 |
| 2023/0081534 A1* | 3/2023 | Kim | ...................... | H04L 5/0094 |
| | | | | 370/329 |
| 2023/0164695 A1* | 5/2023 | Park | .................. | H04W 72/0446 |
| | | | | 370/318 |
| 2024/0291619 A1* | 8/2024 | Ouchi | ................... | H04L 5/0048 |

FOREIGN PATENT DOCUMENTS

| | | | | |
|---|---|---|---|---|
| JP | 2013-232766 A | | 11/2013 | |
| JP | WO2018079025 A1 | * | 5/2018 | ............ H04W 24/02 |
| JP | WO2018173203 A1 | * | 9/2018 | ............ H04W 24/02 |
| JP | 2019-528636 A | * | 10/2019 | ............ H04W 72/12 |
| KR | 1020180052150 A | * | 5/2018 | ................ H04B 7/06 |
| KR | 3 410 610 A1 | * | 12/2018 | ................ H04L 1/06 |
| KR | 20190043069 A | | 4/2019 | |
| KR | 1020190043069 A | * | 4/2019 | ............... H04B 7/06 |
| WO | 2018/079025 A1 | | 5/2018 | |
| WO | 2018/173203 A1 | | 9/2018 | |
| WO | WO 2024/046567 A1 | * | 3/2024 | ............ H04W 52/02 |

OTHER PUBLICATIONS

International Search Report and Written Opinion of PCT Application No. PCT/JP2021/000312, issued on Mar. 23, 2021, 11 pages of ISRWO.

Doostnejad, et al., "Multi-AP Collaborative BF in IEEE 802.11", Institute of Electrical and Electronics Engineers (IEEE), May 8, 2019, 18 pages.

\* cited by examiner

WIRELESS BASE STATION AND WIRELESS TERMINAL

CROSS REFERENCE TO RELATED APPLICATIONS

This application is a U.S. National Phase of International Patent Application No. PCT/JP2021/000312 filed on Jan. 7, 2021, which claims priority benefit of Japanese Patent Application No. JP 2020-036687 filed in the Japan Patent Office on Mar. 4, 2020. Each of the above-referenced applications is hereby incorporated herein by reference in its entirety.

TECHNICAL FIELD

The present technology relates to a wireless base station and a wireless terminal. Specifically, the present technology relates to a wireless base station and a wireless terminal in a wireless system including a plurality of wireless base stations that performs joint transmission.

BACKGROUND ART

In a wireless LAN, in one basic service set (BSS), an access point (AP or BS) and a terminal (STA or UE) autonomously obtain a transmission right in the BSS, and perform communication. In a case where a plurality of antennas is mounted on a transmission terminal, transmission can be performed with a high gain to a desired destination terminal by transmission (beamforming (BF)) using a plurality of antennas simultaneously, and the system throughput in the BSS can be improved. In general, the gain obtained by beamforming is proportional to the number of antennas used simultaneously. By expanding the beamforming, the system throughput can be improved by transmission by a plurality of mutually cooperating APs (hereinafter, referred to as multiple APs).

There is a plurality of schemes for multiple APs, and among them are coherent joint transmission (CJT) in which APs perform transmission as one virtual AP having antennas equivalent to the total number of all their antennas and non-coherent joint transmission (NCJT) in which APs perform transmission to a common reception terminal by forming beams independently in units of individual APs. These are roughly classified into joint transmission (JT) from multiple APs to a common destination terminal. Further, there is also coordinated nulling in which APs form nulls so that when performing communication with mutually different terminals by forming beams independently in units of individual APs, the APs do not interfere with each other's communication terminals. In an environment where there is a plurality of APs, all these schemes can achieve higher system throughput than in a case where cooperation is not performed among a plurality of APs.

In NCJT and CJT, there is a problem that also interference with a terminal of another BSS that has a correlation in the propagation path with a desired destination terminal as viewed from the transmission terminal is increased and system throughput including other not-cooperating BSSs cannot be improved. In particular, in CJT, since a gain corresponding to the number of antennas of a plurality of APs is obtained, the increase in the amount of interference with other BSSs is more significant. Hence, in transmission by multiple APs, it is necessary to appropriately select the joint scheme in accordance with the propagation path in order to maximize the system throughput. For example, a technology in which potential interference in a communication system including a plurality of wireless devices is estimated and transmission is stopped or corrected is proposed (see, for example, Patent Document 1).

CITATION LIST

Patent Document

Patent Document 1: Japanese National-Phase Publication No. 2019-528636

SUMMARY OF THE INVENTION

Problems to be Solved by the Invention

In the conventional technology described above, when estimating potential interference, a known beamforming training protocol is used, and it is difficult to reflect information regarding the propagation path. Therefore, there is a problem that it is difficult to appropriately estimate interference caused by joint transmission.

The present technology has been made in view of such circumstances, and an object of the present technology is to appropriately estimate interference caused by joint transmission.

Solutions to Problems

The present technology is provided to solve the above issues, and according to the first aspect of the present technology, there is provided a wireless base station including a wireless control section that generates a reference signal for estimating interference that is, when performing joint transmission with a joint wireless base station, given to a wireless terminal connected to another wireless base station and determines a setting regarding the joint transmission in accordance with a result of estimation of the interference based on the reference signal, and a communication section that transmits the reference signal to the another wireless base station or the wireless terminal and announces the setting regarding the joint transmission to the joint wireless base station. This brings about an action that the joint scheme is determined according to a result of estimation of interference and is notified to a joint wireless base station.

Further, in the first aspect, the wireless control section may inquire of the another wireless base station whether or not measurement for estimation of the interference can be performed prior to transmission of the reference signal. This brings about an action in which before measurement of interference estimation is performed, whether or not the measurement can be performed is inquired of another wireless base station.

Further, in the first aspect, the wireless control section may generate information regarding precoding of the reference signal, and the communication section may transmit the information regarding precoding of the reference signal to the joint wireless base station. This brings about an action in which information regarding precoding is transmitted to a joint wireless base station.

Further, in the first aspect, the information regarding precoding may include information regarding a frequency at which the reference signal is used, information regarding a codebook predetermined with the joint wireless base station, and information regarding a weighting factor to be calculated to the reference signal.

Further, in the first aspect, the information regarding precoding may include information regarding a time offset for the joint wireless base station at a time of transmission of the reference signal. In this case, the information regarding precoding may include at least one piece of information indicating presence or absence of the time offset or information indicating the time offset.

Further, in the first aspect, the wireless control section, prior to transmission of the reference signal, may generate information indicating that measurement for estimation of the interference is to be implemented, and the communication section may transmit, to the another wireless base station, the information indicating that measurement for estimation of the interference is to be implemented. This brings about an action in which, prior to the transmission of a reference signal, it is announced that measurement for interference estimation is to be implemented. In this case, the information indicating that measurement for estimation of the interference is to be implemented may include information regarding a time to transmit the reference signal, an implementation period of the measurement, and a frequency at which the measurement is implemented.

Further, in the first aspect, the wireless control section may determine a joint parameter including at least one of a joint transmission scheme, precoding, an encoding scheme, or transmission power in the joint transmission on the basis of a result of estimation of the interference from the another wireless base station. In this case, the joint parameter is determined on the basis of a predetermined criterion.

Further, in the first aspect, the reference signal may include information for estimating a propagation path between the wireless base station and a wireless terminal connected to the wireless base station, and the communication section may transmit the reference signal to the wireless terminal connected to the wireless base station. This brings about an action in which a propagation path is estimated in parallel with interference estimation.

Further, in the first aspect, the setting of the joint transmission announced by the communication section may include information regarding a number of the joint wireless base stations. Furthermore, the setting of the joint transmission announced by the communication section may further include at least one of information regarding a joint transmission scheme in the joint transmission, information regarding a transmission antenna to be used in the joint wireless base station, information regarding the wireless terminal of a destination in the joint transmission, or information regarding precoding of the wireless terminal of a destination in the joint transmission. Furthermore, the information regarding precoding of the wireless terminal of a destination in the joint transmission may include information regarding a number of the wireless terminals of destinations, information that identifies the wireless terminal of a destination, and information regarding a frequency, an encoding scheme, transmission power, and a stream to be used in the joint transmission.

Further, according to the second aspect of the present technology, there is provided a wireless base station including a wireless control section that acquires, from a wireless terminal, information regarding interference with the wireless terminal caused by joint transmission, the interference having been estimated by using a reference signal supplied from any one of a plurality of wireless base stations that performs the joint transmission, and generates overall interference information on the basis of the acquired information regarding the interference, and a communication section that transmits the overall interference information to any one of the plurality of wireless base stations that performs the joint transmission. This brings about an action in which overall interference information is generated on the basis of individual interference information acquired from a wireless terminal and is transmitted to any one of a plurality of wireless base stations that performs joint transmission.

Further, in the second aspect, the communication section may request each of the plurality of wireless base stations that performs the joint transmission to transmit a reference signal for estimating interference given to the wireless terminal because of the joint transmission. This brings about an action that interference estimation is performed with request from other than party to joint transmission as an opportunity.

Further, according to the third aspect of the present technology, there is provided a wireless terminal including a wireless control section that estimates interference received because of joint transmission by using a reference signal supplied from any one of a plurality of wireless base stations that performs the joint transmission, and a communication section that transmits information regarding the estimated interference to another wireless base station. This brings about an action in which a wireless terminal estimates interference received by itself because of joint transmission and transmits the result as individual interference information to a wireless base station.

MODE FOR CARRYING OUT THE INVENTION

Hereinbelow, modes for implementing the present technology (hereinafter, referred to as embodiments) are described. The description is given in the following order.

1. First embodiment (example in which interference caused by joint transmission is estimated on the basis of reference signal)

2. Second embodiment (example in which channel estimation is performed in parallel with interference estimation)

3. Third embodiment (example in which interference estimation is performed with request from other than party to joint transmission as an opportunity)

1. First Embodiment

[Wireless Network System]

Figure 1:
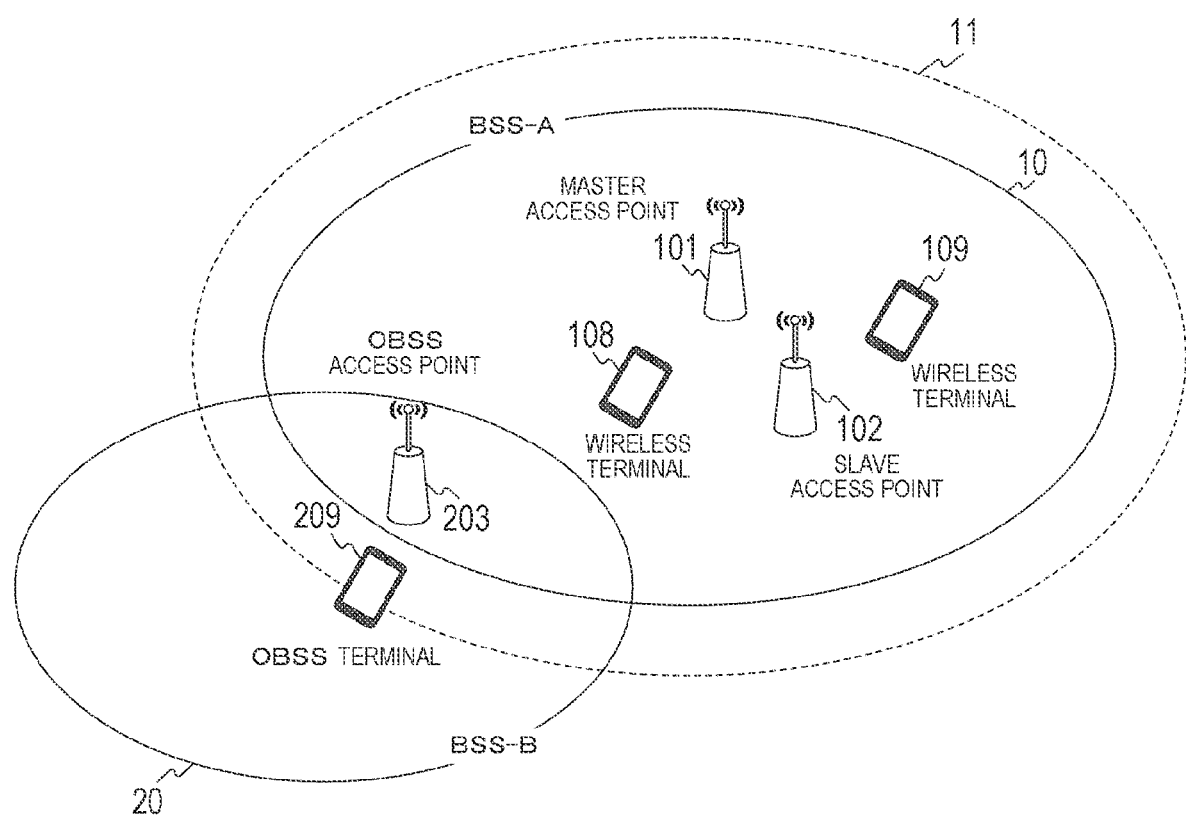
FIG. 1 is a diagram showing a configuration example of a wireless network system in an embodiment of the present technology.

FIG. 1 is a diagram showing a configuration example of a wireless network system in an embodiment of the present technology.

Herein, joint transmission in which simultaneous transmission is cooperatively implemented from a master access point (master AP or sharing AP) 101 and a slave access point (slave AP or shared AP) 102 to a wireless terminal (STA) 108 or 109 is supposed. Further, it is also possible to simultaneously communicate with the wireless terminals 108 and 109. Note that the master access point 101 and the slave access point 102 that perform joint transmission are collectively referred to as multiple APs. Further, a master AP and a slave AP may not be determined in a fixed manner on APs, but may be determined in a dynamic manner among multiple APs. For example, AP 1 may be a master AP and AP 2 may be a slave AP at a certain time t1, and AP 1 may be a slave AP and AP 2 may be a master AP at a different time t2.

In basic service set A (BSS-A), multiple APs and wireless terminals 108 and 109 are connected. Area 10 is a radio wave coverage area in a case where the multiple APs perform non-JT transmission. Area 11 is a radio wave coverage area in a case where the multiple APs perform JT transmission.

Basic service set B (BSS-B) is a BSS having an overlapped area as viewed from BSS-A, that is, an overlapped BSS (OBSS). In BSS-B, an OBSS access point (OBSS-AP) 203 and an OBSS terminal (OBSS-STA) 209 are connected. Area 20 is the coverage area of radio waves from the OBSS access point 203.

It is assumed that the OBSS access point 203 and the multiple APs have a relationship in which they can perform mutual transmission. Further, for the radio wave coverage areas of BSS-A and BSS-B, those for the same frequency channel are shown.

Note that although herein an example in which the OBSS access point 203 is present within a radio wave coverage area in non-JT transmission from the multiple APs of BSS-A is shown, the OBSS access point does not necessarily need to be present within a radio wave coverage area in non-JT transmission. For example, any AP of BSS-A (the master AP 101 or the slave AP 102) and the OBSS access point 203 may be connected by wire, or further, may be within radio wave coverage areas in mutually different frequency channels.

[Device Configuration]

Figure 2:
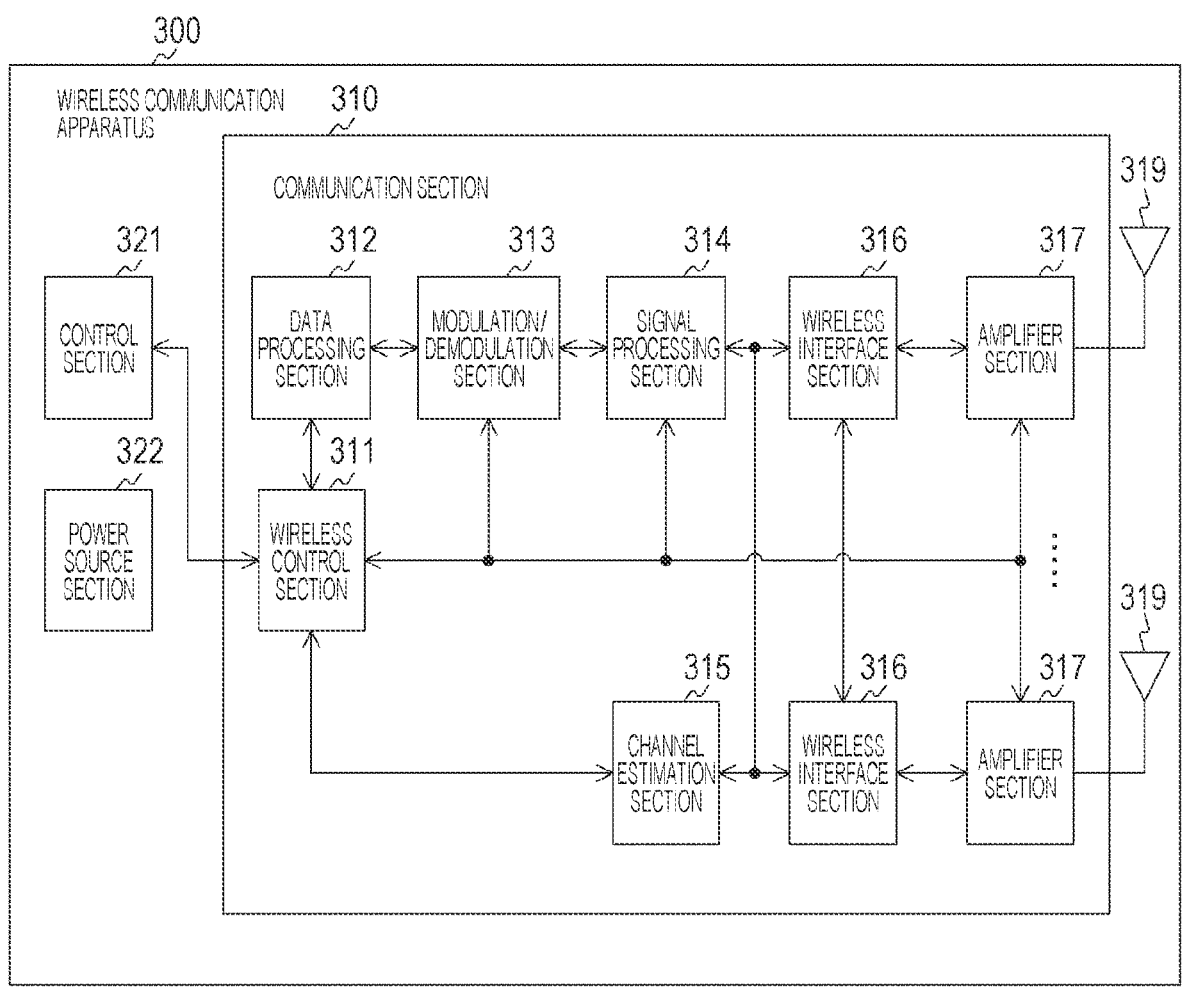
FIG. 2 is a diagram showing a configuration example of a wireless communication apparatus 300 in an embodiment of the present technology.

FIG. 2 is a diagram showing a configuration example of a wireless communication apparatus 300 in an embodiment of the present technology. The wireless communication apparatus 300 shown here includes a master AP 101, a slave AP 102, an OBSS-AP 203, wireless terminals 108 and 109, and an OBSS terminal 209. Further, for example, the wireless communication apparatus 300 may be wireless communication modules or integrated circuits mounted on the APs and the terminals.

The wireless communication apparatus 300 includes a communication section 310, a control section 321, a power source section 322, and antennas 319. There may be a plurality of communication sections 310.

The communication section 310 includes a wireless control section 311, a data processing section 312, a modulation/demodulation section 313, a signal processing section 314, a channel estimation section 315, wireless interface sections 316, and amplifier sections 317. The wireless interface section 316, the amplifier section 317, and the antenna 319 may form one set, and one or more sets may form a constituent component. Further, the function of the amplifier section 317 may be included in the wireless interface section 316. The communication section 310 is obtained by, for example, large scale integration (LSI).

At the time of transmission in which data is inputted from a higher layer, the data processing section 312 generates a packet for wireless transmission from the data, implements processing such as addition of a header for media access control (MAC) or addition of an error detection symbol, and supplies the processed data to the modulation/demodulation section 313. On the other hand, at the time of reception in which there is an input from the modulation/demodulation section 313, the data processing section 312 implements MAC header analysis, packet error detection, reorder processing, etc., and provides the processed data to a protocol higher layer of itself.

The wireless control section 311 performs the exchange of information among the sections. Further, the wireless control section 311 performs parameter setting in the modulation/demodulation section 313 and the signal processing section 314, packet scheduling in the data processing section 312, and parameter setting and transmission power control of the modulation/demodulation section 313, the signal processing section 314, the wireless interface section 316, and the amplifier section 317.

At the time of transmission, the modulation/demodulation section 313 performs encoding, interleaving, and modulation on input data from the data processing section 312 on the basis of an encoding scheme and a modulation scheme set by the wireless control section 311, generates a data symbol stream, and supplies the data symbol stream to the signal processing section 314. At the time of reception, the modulation/demodulation section 313 performs reverse processing to that at the time of transmission on an input from the signal processing section 314, and supplies data to the data processing section 312 or the wireless control section 311.

At the time of transmission, the signal processing section 314 performs signal processing used for spatial separation on an input from the modulation/demodulation section 313 as necessary, and supplies the obtained one or more transmission symbol streams to each wireless interface section 316. Note that transmission (hereinafter, cyclic shift delay (CSD)) may be applied while spatial separation is not performed and arbitrary amount of delay are given to the antennas 319 individually. Further, at the time of reception, the signal processing section 314 performs signal processing on a reception symbol stream inputted from each wireless interface section 316, performs spatial resolution of the stream as necessary, and supplies the result to the modulation/demodulation section 313.

The channel estimation section 315 calculates complex channel gain information of a propagation path from a preamble portion and a training signal portion of an input signal from each wireless interface section 316. The calculated complex channel gain information is used for demodulation processing in the modulation/demodulation section 313 and spatial processing in the signal processing section 314 via the wireless control section 311.

At the time of transmission, the wireless interface section 316 converts an input from the signal processing section 314 to an analog signal, implements filtering, up-conversion to a carrier frequency, and phase control, and transmits the result to the antenna 319 or the amplifier section 317. At the time of reception, the wireless interface section 316 implements reverse processing on an input from the antenna 319 or the amplifier section 317, and supplies data to the signal processing section 314 and the channel estimation section 315.

At the time of transmission, the amplifier section 317 amplifies an analog signal inputted from the wireless interface section 316 to a predetermined power, and transmits the result to the antenna 319. At the time of reception, the amplifier section 317 amplifies a signal inputted from the antenna 319 to a predetermined power, and outputs the result to the wireless interface section 316. All or part of at least one of the functions at the time of transmission or the function at the time of reception of the amplifier section 317 may be included in the wireless interface section 316. Further, all or part of at least one of the functions at the time of transmission or the function at the time of reception of the amplifier section 317 may be a constituent component outside the communication section 310.

The control section 321 controls the wireless control section 311 and the power source section 322. Further, the control section 321 may, in place of the wireless control section 311, implement at least part of the operation of the wireless control section 311.

The power source section 322 includes a battery power source or a fixed power source, and supplies power to each section of the wireless communication apparatus 300.

Among these configurations, the wireless control section 311 and the control section 321 control each section to perform the following operation.

[Operation]

Figure 3:
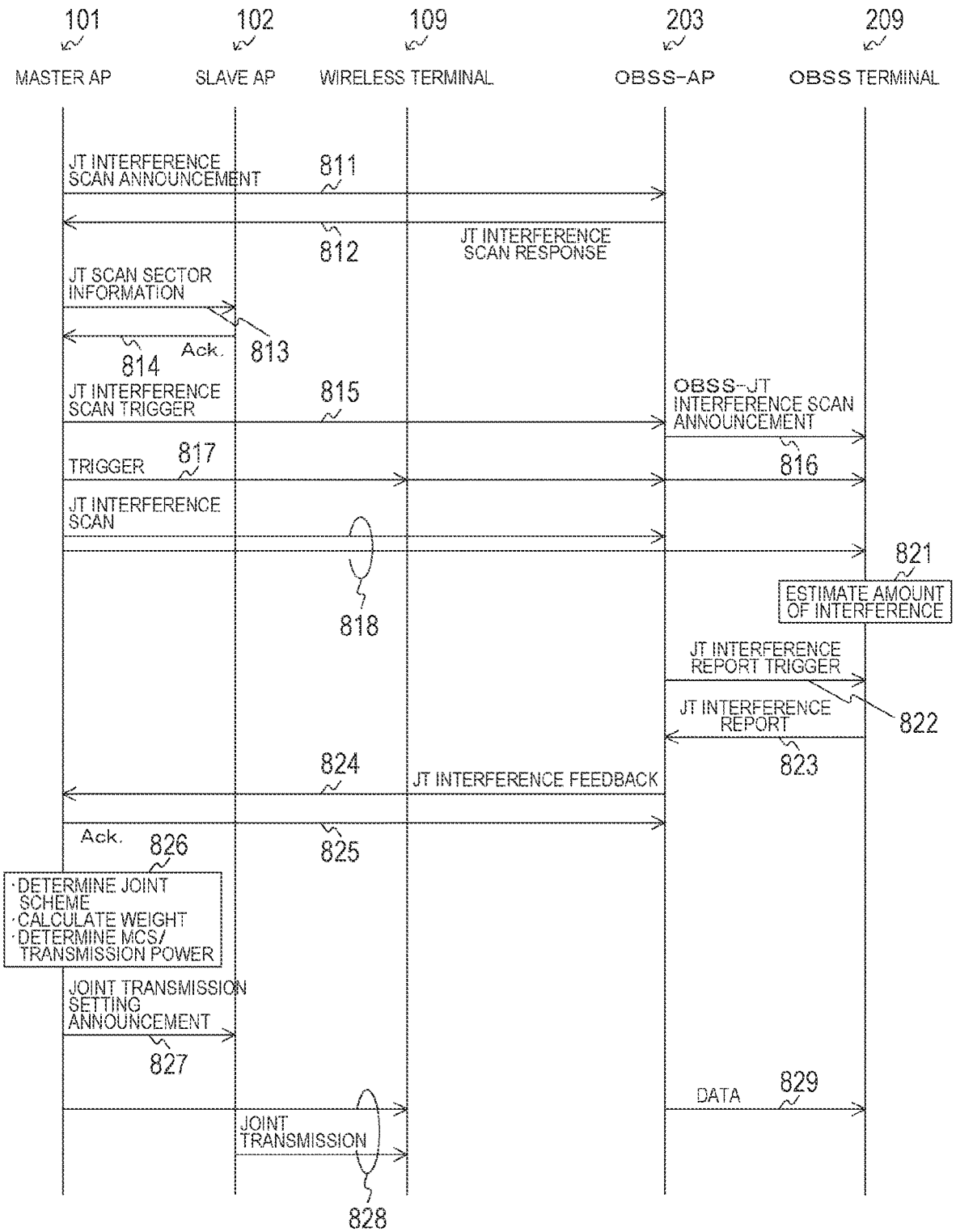
FIG. 3 is a sequence diagram showing an operation example of a wireless network system in a first embodiment of the present technology.

FIG. 3 is a sequence diagram showing an operation example of a wireless network system in a first embodiment of the present technology.

Herein, access points (a master AP 101 and a slave AP 102) and a wireless terminal 109 included in a first BSS are supposed. Further, an access point, OBSS-AP 203 and an OBSS terminal 209 included in a second BSS (hereinafter, an overlapped BSS (OBSS)) are supposed.

[JT Interference Scan Announcement]

First, the master AP 101 performs, on the OBSS-AP 203, an announcement (JT interference scan announcement) 811 that requests a response as to whether or not the multiple APs can execute interference measurement on the OBSS terminal 209. At this time, information indicating the start time and the execution period of interference measurement may be included in the announcement. Further, the JT interference scan announcement on the OBSS-AP 203 may be performed by at least one of the master AP 101 or the slave AP 102.

The JT interference scan announcement 811 may be executed after it is determined that the multiple APs implement joint transmission 828. However, it is not necessary to implement the JT interference scan announcement 811 every time for each joint transmission. This is because although the amount of interference with the OBSS is to be estimated in the later performed JT interference feedback 824, in a case where the time variation of the propagation path is relatively long with respect to the period of joint transmission, information highly correlated with information of the amount of interference acquired in the immediately preceding JT interference feedback 824 can be obtained, and thus even if past information is utilized, the impact on the characteristics will be small.

For example, if the multiple APs hold an interference estimation result based on previously-implemented JT interference feedback 824 and it is within the period during which the propagation path can be considered to be constant, the JT interference scan announcement 811 is not executed and the procedure may start from joint scheme determination or the like (826).

Further, similarly, if it is outside the period during which the propagation path can be considered to be constant and the multiple APs recognize the presence of an OBSS, the JT interference scan announcement 811 may be executed. Note that the JT interference scan announcement 811 is an example of a wireless control section mentioned in the claims.

[JT Interference Scan Response]

The OBSS-AP 203 that has received a request for response as to whether or not interference measurement can be executed performs, on the master AP 101, an announcement (JT interference scan response) 812 of whether interference measurement can be executed or not. At this time, a start time and an execution period of interference measurement acceptable to the OBSS-AP 203 may be included in the announcement. Further, the OBSS-AP 203 may notify at least one of the master AP 101 or the slave AP 102.

Depending on the situation, such as a case where only the slave AP 102 is designated as the destination of response announcement from the OBSS-AP 203 or a case where communication quality between the OBSS-AP 203 and the master AP 101 is low, there is a case where only the slave AP 102 receives a response from the OBSS-AP 203. In this case, the slave AP 102 may transfer the response information received from the OBSS-AP 203 to the master AP 101.

The master AP 101 notified of a response as to executability from the OBSS-AP 203 determines whether or not to implement interference measurement on the OBSS on the basis of the received information.

Note that in a case of announcing only whether or not the interference measurement can be executed in response to the information announced by the JT interference scan announcement 811 implemented from the multiple APs, an Ack frame or a block Ack frame prescribed in IEEE 802.11 may be sent.

[JT Scan Sector Information]

In a case where the master AP 101 has determined to implement interference measurement, the master AP 101 executes, on the slave AP 102, an announcement of information (JT scan sector information) 813 for executing interference measurement. This information includes information indicating the start time and the execution period of interference measurement, and a weighting factor for multiplication for an antenna used at the time of interference measurement and a value of cyclic shift delay (hereinafter, precoding), but is not limited thereto.

Further, in a case where the master AP 101 has determined to implement interference measurement, the master AP 101 may notify the slave AP 102 of information indicating the start time and the execution period of interference measurement on the OBSS-AP 203. Note that the JT scan sector information 813 is an example of a communication section mentioned in the claims.

The slave AP 102 that has received information for executing interference measurement from the master AP 101 notifies the master AP 101 of information (Ack) 814 indicating the reception. Ack 814 may be announced as a block Ack prescribed in IEEE 802.11, as necessary.

Note that the slave AP 102 may notify the master AP 101 of, together with Ack 814, information indicating a start time that the slave AP 102 requests. In this case, in a case where the master AP 101 notified of a request of the start time from the slave AP 102 changes the start time, the master AP 101 may execute an announcement of the JT scan sector information 813 again.

[JT Interference Scan Trigger]

In a case where the master AP 101 that has received Ack 814 from the slave AP 102 has determined that the start time of interference measurement is approaching, the master AP 101 executes, on the OBSS-AP 203, an information announcement (JT interference scan trigger) 815 indicating that interference measurement is to be implemented. At this time, the information announcement may include information indicating the start time and the execution period for implementing interference measurement, but is not limited thereto. Note that the JT interference scan trigger 815 is an example of a communication section mentioned in the claims.

Note that in a case where the master AP 101 has determined that it is difficult for the JT interference scan trigger 815 to be correctly received by the OBSS-AP 203, such as a case where communication quality between the master AP 101 and the OBSS-AP 203 is low, the JT interference scan trigger 815 may be announced from both the master AP 101 and the slave AP 102, or only the slave AP 102.

Further, although the start time of interference measurement is the time indicated by the JT scan sector information 813, the start time may be determined by the master AP 101 on the basis of information announced together with Ack 814 from the slave AP 102.

[OBSS-JT Interference Scan Announcement]

The OBSS-AP 203 that has received, from at least one of the master AP 101 or the slave AP 102, information indicating that interference measurement is to be implemented executes, on the OBSS terminal 209, an information announcement (OBSS JT interference scan announcement) 816 indicating that interference measurement is to be implemented from the multiple APs. The information announced by the OBSS JT interference scan announcement 816 may be information indicating the start time and the execution period for implementing interference measurement, but is not limited thereto.

[JT Interference Scan]

After the JT interference scan trigger 815 indicating that interference measurement is to be implemented is executed on the OBSS-AP 203, the multiple APs that have determined that it is time to start interference measurement perform, on the OBSS terminal 209, an announcement (JT interference scan) 818 of information including a reference signal of interference measurement. At this time, the reference signal is transmitted by precoding predetermined among the multiple APs. The precoding may be determined on the basis of a discrete Fourier transformation (DFT) matrix or information announced in advance by the master AP 101 to the slave AP 102. Further, a plurality of pieces of precoding may be applied in a time division manner. Note that the JT interference scan 818 is an example of a communication section mentioned in the claims.

The OBSS terminal 209 that has received a reference signal of interference measurement from the multiple APs estimates the amount of interference for each observed piece of precoding (821). The amount of interference for precoding is calculated as received power, but may be calculated by other techniques.

Note that, immediately before implementing the JT interference scan 818, the multiple APs may execute a trigger 817 announcing that the JT interference scan 818 is to be implemented.

[JT Interference Report Trigger and JT Interference Report]

After the transmission of a reference signal for interference measurement from the multiple APs to the OBSS terminal 209 is ended, the OBSS terminal 209 executes, on the OBSS-AP 203, an information announcement (JT interference report) 823 indicating the estimated amount of interference observed. At this time, this may be executed after a request (JT interference report trigger) 822 for transmission of the estimated amount of interference is announced from the OBSS-AP 203. Note that the JT interference report 823 is an example of a communication section or a wireless control section mentioned in the claims.

Note that in a case where there is a plurality of OBSS terminals 209, the JT interference report 823 may be executed by the orthogonal frequency domain multiple access (OFDMA) scheme. In this case, the JT interference report trigger 822 may include information indicating the frequency that each OBSS terminal 209 uses in OFDMA.

[JT Interference Feedback]

The OBSS-AP 203 to which information indicating the estimated amount of interference observed has been announced from all desired OBSS terminals 209 executes, on the multiple APs, an announcement (JT interference feedback) 824 of information indicating the results of the estimated amount of interference. Note that although this example shows a case where the master AP 101 is notified, notification may be performed to at least one of the master AP 101 or the slave AP 102. Note that the JT interference feedback 824 is an example of a result of estimation of interference from another wireless base station, or a communication section mentioned in the claims.

The multiple APs to which information indicating the result of the estimated amount of interference has been announced from the OBSS-AP 203 notify the OBSS-AP 203 of Ack 825. Ack 825 may be announced as a block Ack prescribed in IEEE 802.11, as necessary. Further, although this example shows a case where the master AP 101 notifies the OBSS-AP 203, at least one of the master AP 101 or the slave AP 102 may announce Ack 825.

[Joint Transmission Setting Determination]

The master AP 101 that has received information indicating the result of the estimated amount of interference from the OBSS-AP 203 performs determination 826 of a setting regarding joint transmission with the slave AP 102 on the basis of the information announced. The setting regarding a joint scheme includes at least one of a joint transmission scheme with the slave AP 102, precoding in joint transmission with the slave AP 102, or scheduling including transmission power and a modulation and coding scheme (MCS) in joint transmission with the slave AP 102.

[Joint Transmission Setting Announcement]

The master AP 101 that has performed the determination 826 of a setting regarding joint transmission executes, on the slave AP 102, an information announcement (joint transmission setting announcement: JT scheme announcement) 827 indicating a setting regarding joint transmission of the slave AP 102. Note that the joint transmission setting announcement 827 is an example of a communication section mentioned in the claims.

The slave AP 102 that has received the joint transmission setting announcement 827 from the master AP 101 may notify the master AP 101 of an Ack. This Ack may be announced as a block Ack prescribed in IEEE 802.11, as necessary.

If the setting regarding joint transmission is completed by the joint transmission setting announcement 827, the master AP 101 and the slave AP 102 perform joint transmission (coordinated transmission) 828 on the basis of the setting. At this time, the OBSS-AP 203 can transmit data 829 to the OBSS terminal 209 independently of joint transmission by the multiple APs.

[Frame Configuration]

In the following, the configurations of the frames, etc. described in the above sequence diagram are described in detail.

[JT Interference Scan Announcement]

Figure 4:
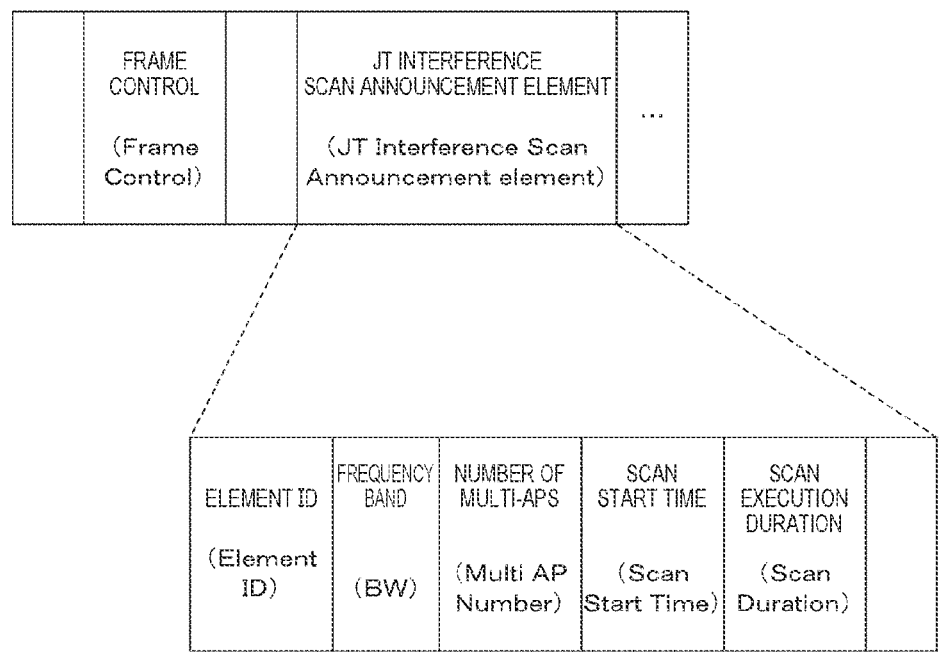
FIG. 4 is a diagram showing a frame configuration example of a JT interference scan announcement 811 in the first embodiment of the present technology.

FIG. 4 is a diagram showing a frame configuration example of a JT interference scan announcement 811 in the first embodiment of the present technology.

The JT interference scan announcement 811 is used for the multiple APs announcing, to the OBSS-AP 203 of an interference measurement target, the start time and the execution period in a case where the multiple APs execute the JT interference scan 818 and requesting a response of request values of the OBSS-AP 203 regarding the start time and the execution period. This frame includes "Frame Control" and "JT Interference Scan Announcement element" as shown below, but is not limited thereto.

The "Frame Control" includes information indicating that this frame is a frame announced as the JT interference scan announcement 811. However, it is not necessary that such information be included in the "Frame Control" alone, and a configuration in which the fact that this frame is the JT interference scan announcement 811 is indicated by additionally using other information in this frame may be applied. For example, a configuration in which an interpretation can be made by additionally using a value of an arbitrary field in the "JT Interference Scan Announcement element" may be applied.

The "JT Interference Scan Announcement element" includes at least one of the fields of "Element ID", "Frequency Band", "Number of Multiple APs", "Scan Start Time", and "Scan Execution Period".

The "Element ID" includes information indicating that this element is a JT interference scan announcement element and information indicating the bit length of this element. Note that each of the "Element ID"s shown hereinafter includes information indicating similar information to the above-described "Element ID". However, in a case where a certain element is determined to be necessarily present, the "Element ID" of this element may be omitted.

The "Frequency Band" (band width (BW)) includes information indicating a request value of the frequency band in which the multiple APs implement the JT interference scan 818. The "Number of Multiple APs" (Multi AP Number) includes information indicating the number of access points that execute the JT interference scan 818. The "Scan Start Time" includes information indicating the start time of the JT interference scan 818 requested by the multiple APs. The "Scan Execution Period" (Scan Duration) includes information indicating the execution period of the JT interference scan 818 requested by the multiple APs.

[JT Interference Scan Response]

Figure 5:
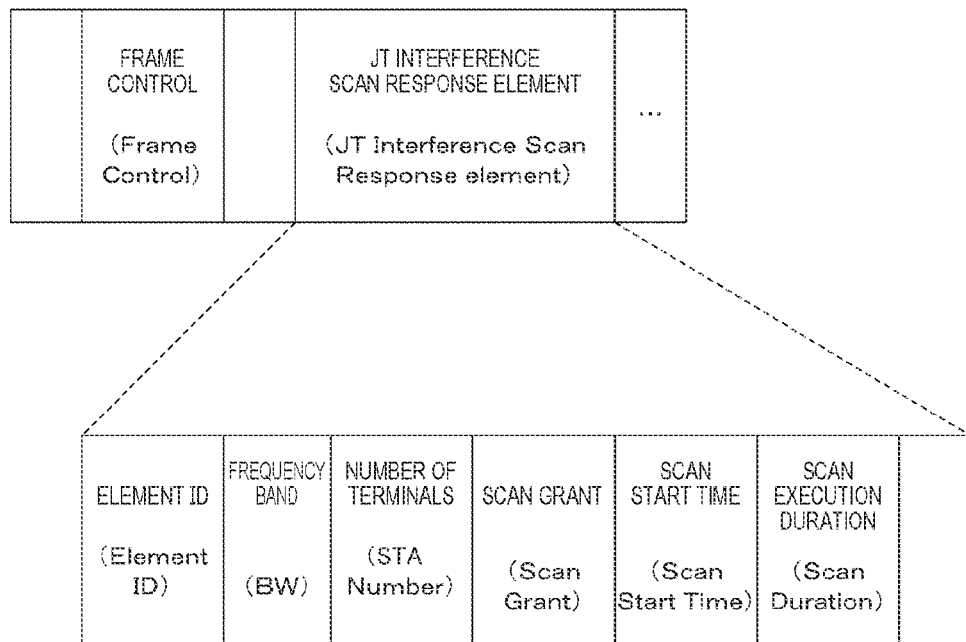
FIG. 5 is a diagram showing a frame configuration example of a JT interference scan response 812 in the first embodiment of the present technology.

FIG. 5 is a diagram showing a frame configuration example of the JT interference scan response 812 in the first embodiment of the present technology.

The JT interference scan response 812 is used so that the OBSS-AP 203 on which the JT interference scan announcement 811 has been executed by the multiple APs announces information regarding the execution of the JT interference scan 818, such as whether or not the JT interference scan 818 can be performed, and the start time and the execution period, on the basis of the information announced. This frame includes "Frame Control" and "JT Interference Scan Response element" as shown below, but is not limited thereto.

The "Frame Control" includes information indicating that this frame is a frame announced as the JT interference scan response 812. However, it is not necessary that such information be included in the "Frame Control" alone, and a configuration in which the fact that this frame is the JT interference scan response 812 is indicated by additionally using other information in this frame may be applied. For example, a configuration in which an interpretation can be made by additionally using a value of an arbitrary field in the "JT Interference Scan Response element" may be applied.

The "JT Interference Scan Response element" includes at least one or more of the fields of "Element ID", "Frequency Band", "Number of Terminals", "Scan Grant", "Scan Start Time", and "Scan Execution Period".

The "Frequency Band" (BW) includes information indicating a frequency band that the OBSS-AP 203 requests in regard to the frequency band that the multiple APs use in the JT interference scan 818. The "Number of Terminals" (STA Number) includes information indicating the number of wireless terminals connected to the OBSS-AP 203 present in the OBSS. The "Scan Grant" includes information indicating, to the multiple APs, a request by the OBSS-AP 203 as to whether or not the JT interference scan 818 can be executed. The "Scan Start Time" includes information indicating a start time that the OBSS-AP 203 requests in regard to the JT interference scan 818 to be implemented by the multiple APs. The "Scan Execution Period" (Scan Duration) includes information indicating an execution period of the JT interference scan 818 that the OBSS-AP 203 requests in regard to the JT interference scan 818 to be implemented by the multiple APs.

Note that the multiple APs that have received the JT interference scan response 812 may determine whether or not the JT interference scan 818 can be implemented on the basis of information indicated by the "Number of Terminals". Further, in a case where the "Scan Grant" includes information indicating to the multiple APs that the execution of the JT interference scan 818 is rejected, neither the "Scan Start Time" nor the "Scan Execution Period" may be present.

[JT Scan Sector Information]

Figure 6:
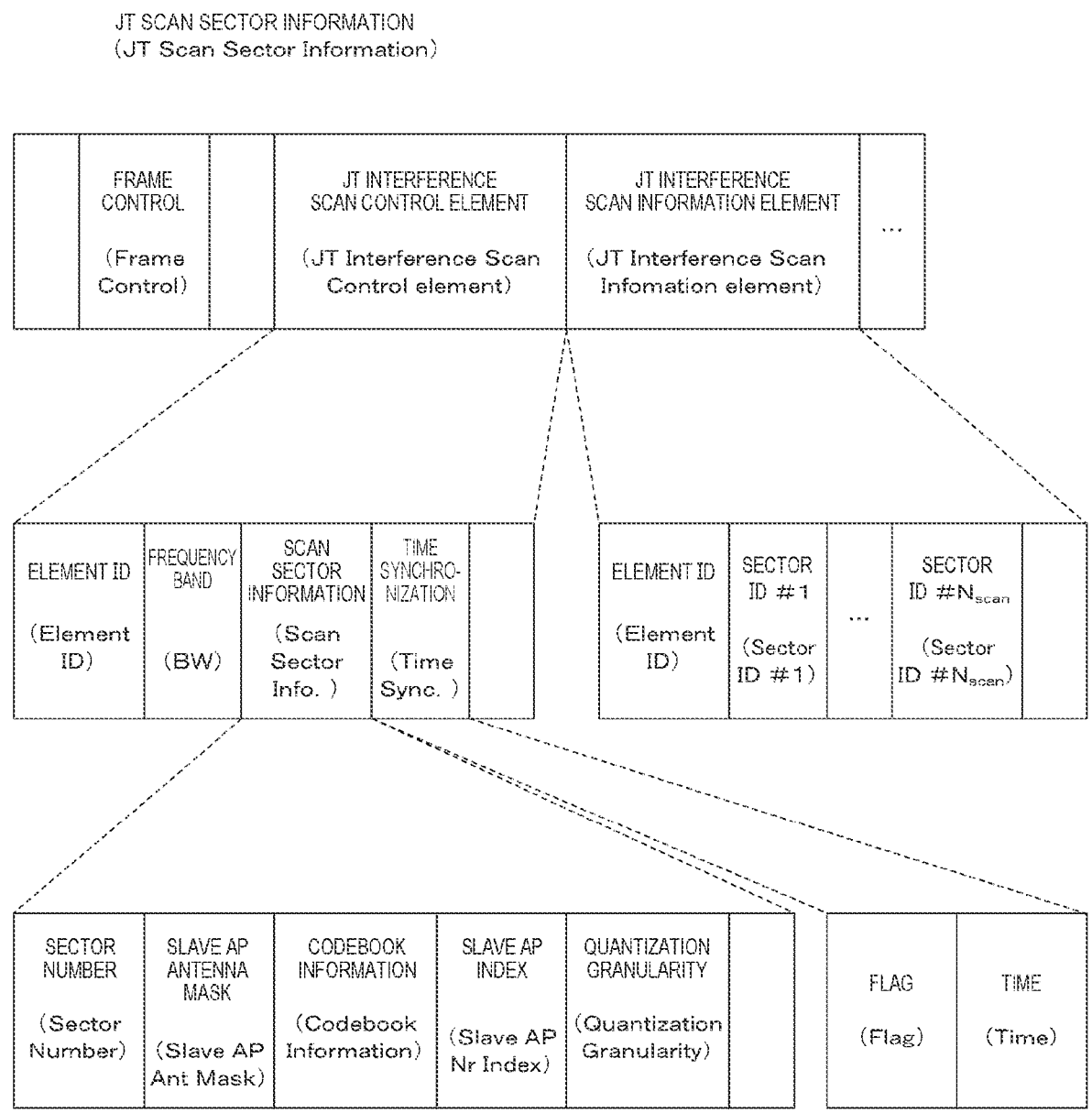
FIG. 6 is a diagram showing a frame configuration example of a JT scan sector information 813 in the first embodiment of the present technology.

FIG. 6 is a diagram showing a frame configuration example of the JT scan sector information 813 in the first embodiment of the present technology.

The JT scan sector information 813 is used to announce, from the master AP 101 to the slave AP 102, information necessary to implement the JT interference scan 818. This frame includes "Frame Control", "JT Interference Scan Control element", and "JT Interference Scan Information element" as shown below, but is not limited thereto. Note that the "JT Interference Scan Control element" and the "JT Interference Scan Information element" may be collectively defined as one element without being separated.

The "Frame Control" includes information indicating that this frame is a frame announced as the JT scan sector information 813. However, it is not necessary that such information be included in the "Frame Control" alone, and a configuration in which the fact that this frame is the JT scan sector information 813 is indicated by additionally using other information in this frame may be applied. For example, a configuration in which an interpretation can be made by additionally using a value of an arbitrary field in the "JT Interference Scan Control element" may be applied.

The "JT Interference Scan Control element" includes information for estimating each field length in the subsequent "JT Interference Scan Information element" in advance, but is not limited thereto. This element includes at least one or more of the fields of "Frequency Band", "Scan Sector Information", and "Time Synchronization" in addition to "Element ID".

The "Frequency Band" (BW) includes information indicating the frequency band in which the JT interference scan 818 is implemented. The "Scan Sector Information" includes information indicating the number, form, and format of each "Sector ID" field in the subsequent "JT Interference Scan Information element". The "Time Synchronization" (Time Sync) includes information regarding the transmission timing between the master AP 101 and the slave AP 102 in a case where the JT interference scan 818 is implemented by the multiple APs. Note that the "Time Synchronization" is an example of information regarding a time offset mentioned in the claims.

The "Scan Sector Information" includes at least one or more of the subfields of "Sector Number", "Slave AP Antenna Mask", "Codebook Information", "Slave AP Index", and "Quantization Granularity".

The "Sector Number" includes information indicating the number of pieces of precoding used in the JT interference scan 818. The "Slave AP Antenna Mask" (Slave AP Ant Mask) includes information indicating the antenna of the slave AP 102 used in the JT interference scan 818. In a case where a candidate for precoding used to implement the JT interference scan 818 is predetermined between the master AP 101 and the slave AP 102, the "Codebook Information" includes information indicating whether or not to use the precoding candidate. The "Slave AP Index" (Slave AP Nr Index) includes information specifying, among precoding candidates, a range applied to each slave AP 102. The "Quantization Granularity" includes information indicating how many bits of information each numerical value included in precoding is expressed by.

For precoding, a plurality of kinds of precoding is announced, and information indicating each kind is stored in the respective "Sector ID" field in the subsequent "JT Interference Scan Information element". For example, in a case where precoding candidates are predetermined as a DFT matrix between the master AP 101 and the slave AP 102, information indicating the row number of a piece of precoding to be used by a slave AP 102 among the precoding candidates is stored in the "Slave AP Index". On the other hand, in a case where precoding candidates are not determined between the master AP 101 and the slave AP 102, it is necessary to announce a precoding matrix, and the "Quantization Granularity" is used to grasp a precoding matrix from information stored in the "Sector ID" field.

Further, the "Time Synchronization" includes at least one or more of the subfields of "Flag" and "Time".

The "Flag" includes information indicating whether or not, in a case where the multiple APs implement the JT interference scan 818, the transmission timing should be shifted between the master AP 101 and the slave AP 102. In a case where the "Flag" includes information indicating that the JT interference scan 818 is to be implemented with the transmission timing shifted, the "Time" includes information indicating the value of the shift in transmission timing.

Note that the "Flag" and the "Time" may be implemented as follows. That is, for example, a case of setting of "1" in the "Flag" may indicate that the transmission timing is shifted between the master AP 101 and the slave AP 102, and the transmission timing may be read in accordance with information indicated by the "Time". Further, for example, a setting of "0" in the "Time" may indicate that transmission is performed simultaneously without shifting the timing between the master AP 101 and the slave AP 102. Note that the "Flag" is an example of information indicating the presence or absence of a time offset mentioned in the claims. Further, the "Time" is an example of information indicating a time offset mentioned in the claims.

The "JT Interference Scan Information element" includes detailed information of precoding used in the JT interference scan 818 that is not included in the "JT Interference Scan Control element", but is not limited thereto. This element includes the fields of "Sector ID"s in addition to "Element ID".

The "Sector ID" includes information indicating a precoding matrix. There is a total of Nscan "Sector ID" fields; Nscan is determined on the basis of the value of the "Sector Number" subfield in the "JT Interference Scan Control element". The information indicated by the "Sector ID" is used in the JT interference scan 818 when the multiple APs generate TRN, which is a sequence for estimating the amount of interference, and is information indicating Q described later. Note that the "Slave AP Index", the "Quantization Granularity", and the "Sector ID" are examples of a weighting factor mentioned in the claims.

[JT Interference Scan Trigger]

Figure 7:
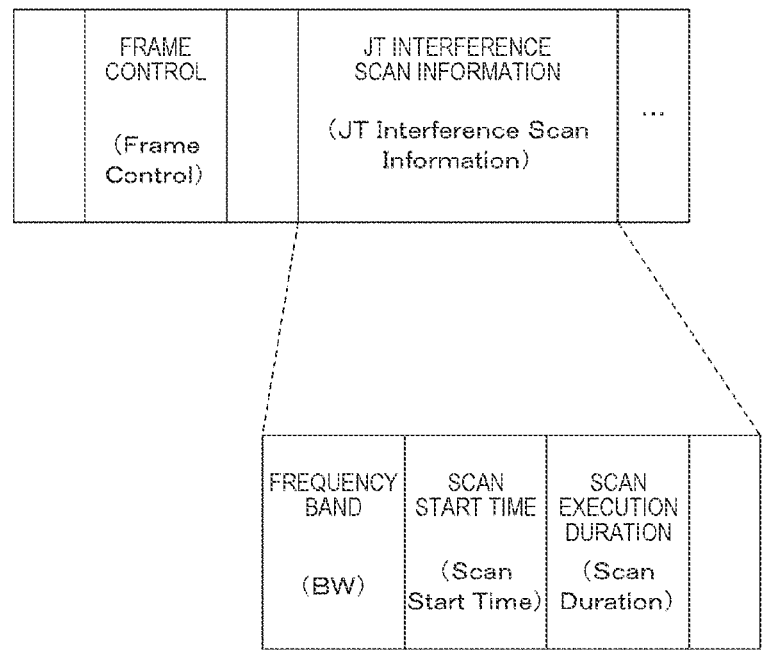
FIG. 7 is a diagram showing a frame configuration example of a JT interference scan trigger 815 in the first embodiment of the present technology.

FIG. 7 is a diagram showing a frame configuration example of a JT interference scan trigger 815 in the first embodiment of the present technology.

The JT interference scan trigger 815 is used when announcing, from the multiple APs to the OBSS-AP 203, information indicating the timing at which the JT interference scan 818 is implemented. This frame includes "Frame Control" and "JT Interference Scan Information" as shown below, but is not limited thereto.

The "Frame Control" includes information indicating that this frame is a frame announced as the JT interference scan trigger 815. However, it is not necessary that such information be included in the "Frame Control" alone, and a configuration in which the fact that this frame is the JT interference scan trigger 815 is indicated by additionally using other information in this frame may be applied. For example, a configuration in which an interpretation can be made by additionally using a value of an arbitrary field in the "JT Interference Scan Information" may be applied.

The "JT Interference Scan Information" includes information indicating the timing at which the JT interference scan 818 is implemented, but is not limited thereto. This field includes the subfields of "Frequency Band", "Scan Start Time", and "Scan Execution Period", but is not limited thereto.

The "Frequency Band" (BW) includes information indicating the frequency channel on which the multiple APs implement the JT interference scan 818. The "Scan Start Time" includes information regarding the time at which the multiple APs implement the JT interference scan 818. The "Scan Execution Period" (Scan Duration) includes information indicating the period during which the multiple APs implement the JT interference scan 818. Note that the "Scan Start Time" is an example of information regarding a time to transmit a reference signal, which is mentioned in the claims. Further, the "Scan Execution Period" is an example of information regarding an execution period of measurement mentioned in the claims. Further, the "Frequency Band" is an example of information regarding a frequency at which measurement is implemented, which is mentioned in the claims.

[JT Interference Scan]

Figure 8:
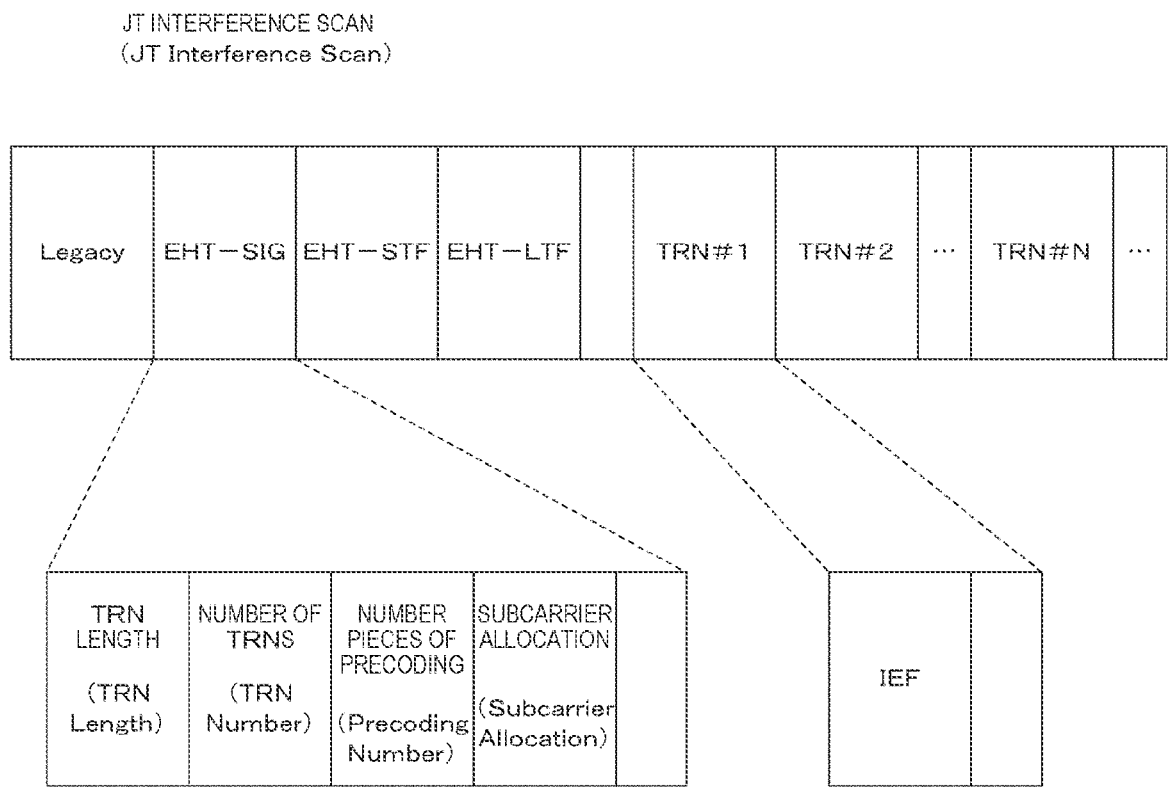
FIG. 8 is a diagram showing a configuration example of a data unit announced by a JT interference scan 818 in the first embodiment of the present technology.

FIG. 8 is a diagram showing a configuration example of a data unit announced by a JT interference scan 818 in the first embodiment of the present technology.

This data unit is transmitted from the multiple APs to the OBSS terminal 209 in order to estimate the amount of interference. This data unit includes the fields of "Legacy", "EHT-SIG", "EHT-STF", "EHT-LTF", and "TRN #1" to "TRN #N", but is not limited thereto.

The "Legacy" is used to, at the time of receiving this data unit, perform time synchronization and frequency synchronization, and estimate propagation path information necessary when demodulating a subsequent frame. This may be a sequence that is known among transmission/reception terminals in advance. Note that this may be used for purposes other than these.

The "EHT-SIG" includes information indicating the number of subsequent "TRN #1" to "TRN #N" fields and information regarding the inside of each "TRN" field. Note that the constituent components of the "EHT-SIG" are not limited thereto. The "EHT-SIG" includes at least one of the fields of "TRN Length", "Number of TRNs", "Number of Pieces of Precoding", and "Subcarrier Allocation".

The "TRN Length" includes information regarding the total number of bits of the subsequent "TRN #1" to "TRN #N". The "Number of TRNs" (TRN Number) includes information regarding the subfield length of the "Interference Estimation Field (IEF)" in each "TRN" field. The "Number of Pieces of Precoding" (Precoding Number) includes information regarding precoding used in the subsequent "TRN". The "Subcarrier Allocation" includes information necessary to, when a plurality of pieces of precoding is multiplexed in the "IEF" in the subsequent "TRN" field, demultiplex the plurality of pieces of precoding. Note that the "Number of Pieces of Precoding" may include information indicating the number of pieces of precoding used in the subsequent "IEF". Further, the "Subcarrier Allocation" may include information indicating the subcarrier allocated to each piece of precoding.

The "EHT-STF" and the "EHT-LTF" are used to perform time synchronization and frequency synchronization together with the "Legacy". Similarly to the "Legacy", each of these may be a sequence that is known among transmission/reception terminals in advance, and the use is not limited to these purposes.

Each of the "TRN #1" to the "TRN #N" is a training sequence used in the OBSS terminal 209 to estimate the amount of interference for an arbitrary piece of precoding. Each "TRN" field includes "IEF" that is a known sequence for estimating the amount of interference in the OBSS terminal 209, but the constituent components are not limited thereto.

The "IEF" (Interference Estimation Field) includes a sequence that estimates the amount of interference for an arbitrary piece of precoding in the OBSS terminal 209. The "IEF" of the "TRN #L" may be the known sequence shown below.

[Math. 1]

$$r_{TRN_{\#L}}(q) = \begin{bmatrix} r_{TRN_{\#L}}(1, q) \\ \vdots \\ r_{TRN_{\#L}(numel(rm),q)} \end{bmatrix} = \frac{1}{K} \sum_{i=1}^{N_p(L)} \sum_{j=1}^{N_f(i)} Q_{c(L,i)}^{(rm)} e^{-j2\pi f k_i(j)q} \quad \text{Formula 1}$$

$$q = 0, 1, \ldots, N_{DFT} - 1$$

Here, m is a number representing an access point included in the multiple APs. L is an ordinal number of "TRN". $r_{TRN\#L}^{(m)}(k,q)$ represents, for the m-th access point, a transmission signal of a baseband at a discrete time q of the k-th antenna that transmits the L-th "TRN" field.

Here, $Q_{c(L,i)}^{(rm)}$ refers to, for the matrix indicated by Q below, the c(L,i)-th column and rows indicated by rm. The column vector $q_1$ or the like of Q is referred to as a precoding vector.

$$Q = [q1 \ q2 \ \ldots \ q_{N_{DFT}-1}]$$

Further, c(L,i) is the column number of a precoding vector multiplexed in the "IEF" of the "TRN #L". rm is a row number group of a precoding vector allocated to the m-th access point among the access points included in the multiple APs. numel(rm) is the number of elements of rm. K is a normalization coefficient. Np(L) is the number of precoding vectors simultaneously applied in the "IEF" in the L-th "TRN" subfield. Nf(i) is the number of subcarriers to which the c(L,i)-th precoding vector is applied. ki(j) is the j-th subcarrier to which the c(L,i)-th precoding vector is applied. NDFT is the number of points of inverse discrete Fourier transformation (IDFT) used in the OFDM modulation scheme. q represents a discrete time.

Specific examples of Q are shown below, but Q is not limited thereto. For example, in a case where all the access points included in the multiple APs transmit "TRN" simultaneously and cooperatively, the discrete Fourier transformation (DFT) matrix or the Hadamard matrix shown below may be used for Q, but Q is not limited thereto.

[Math. 2]

$$Q = \begin{bmatrix} W_0^0 & W_0^1 & \cdots & W_0^{N_{DFT}-1} \\ W_1^0 & W_1^1 & \cdots & W_1^{N_{DFT}-1} \\ \vdots & \vdots & \ddots & \vdots \\ W_{DFT-1}^0 & W_{DFT-1}^1 & \cdots & W_{N_{DFT}-1}^{N_{DFT}-1} \end{bmatrix}, W_a^b = e^{-j2\pi \frac{a}{N_{DFT}}b}$$

Formula 2

Note that Q may not be a matrix determined separately from channel estimation information like that shown above, but may be a matrix determined on the basis of channel estimation information previously obtained by the multiple APs. For example, in a case where a candidate for the precoding vector for use is known among the multiple APs in advance, the candidate may be used.

Further, Q may be expressed so that precoding can be implemented in a time division manner between the master AP 101 and the slave AP 102. Specifically, a matrix like below may be applied.

[Math. 3]

$$Q = \begin{bmatrix} Q_1 & 0 & \cdots & 0 \\ 0 & Q_2 & \cdots & 0 \\ \vdots & \vdots & \ddots & \vdots \\ 0 & 0 & \cdots & Q_{N_{MultiAP}} \end{bmatrix}, Q_i = [q_{i,1} q_{i,2} \cdots q_{i,N_i}]$$

Formula 3

$N_{MultiAP}$ in the above formula represents the number of access points included in the multiple APs. $Q_i$ represents a precoding vector group applied only to the i-th access point included in the multiple APs. This $Q_i$ includes $N_i$ precoding vectors. rm in formula (1) above may be a value indicating the row number of $Q_m$ in Q. Note that $Q_i$ may be determined on the basis of a DFT matrix or an Hadamard matrix.

Although formula (2) shows an example in which precoding is implemented in a cooperative manner by the multiple APs and formula (3) shows an example in which precoding is implemented in a time division manner in units of individual access points included in the multiple APs, Q in which both are combined may be defined.

[JT Interference Report]

Figure 9:
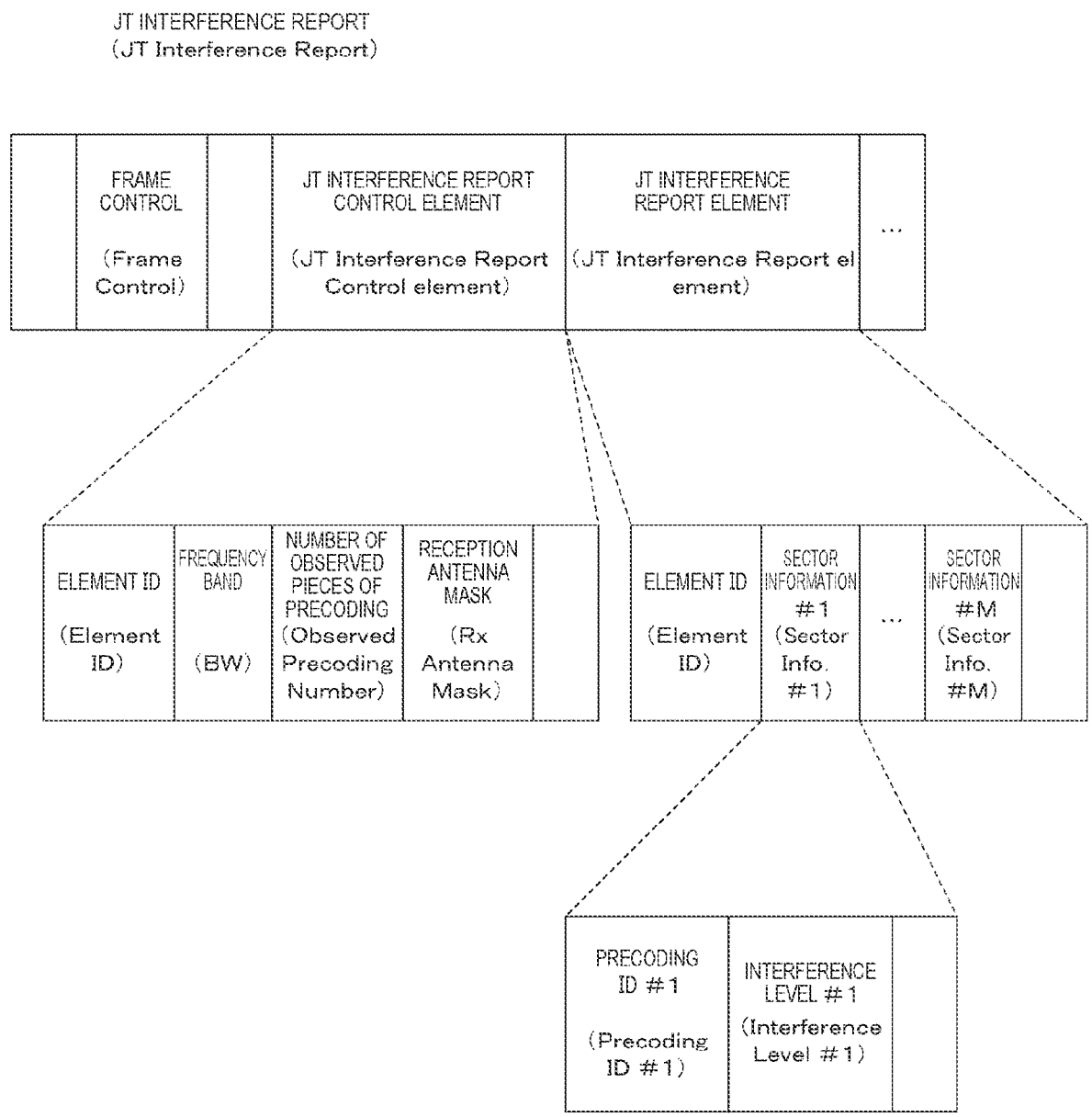
FIG. 9 is a diagram showing a frame configuration example of a JT interference report 823 in the first embodiment of the present technology.

FIG. 9 is a diagram showing a frame configuration example of a JT interference report 823 in the first embodiment of the present technology.

The JT interference report 823 is used to announce the estimated amount of interference to the OBSS access point 203 from the OBSS terminal 209 that has received the JT interference scan 818 from the multiple APs. This frame includes "Frame Control", "JT Interference Report Control element", and "JT Interference Report element", but is not limited thereto.

The "Frame Control" includes information indicating that this frame is a frame announced as the JT interference report 823. However, it is not necessary that such information be included in the "Frame Control" alone, and a configuration in which the fact that this frame is the JT interference report 823 is indicated by additionally using other information in this frame may be applied. For example, a configuration in which an interpretation can be made by additionally using a value of an arbitrary field in the "JT Interference Report Control element" may be applied.

The "JT Interference Report Control element" includes information for estimating each field length in the subsequent "JT Interference Report element" in advance, but is not limited thereto. This element includes at least one piece of information of "Frequency Band", "Number of Observed Pieces of Precoding", and "Reception Antenna Mask" in addition to "Element ID".

The "Frequency Band" (BW) includes information indicating the frequency band of the estimated amount of interference. The "Number of Observed Pieces of Precoding" (Observed Precoding Number) includes information indicating the number of precoding vectors with which interference was estimated. The "Reception Antenna Mask" (RX Antenna Mask) includes information regarding the reception antenna of the OBSS terminal 209 used when interference was estimated. Note that the "Number of Observed Pieces of Precoding" may include information indicating the number of pieces of "Sector Information" in the subsequent "JT Interference Report element".

The "JT Interference Report element", by being combined with the "JT Interference Report Control element", indicates the amount of interference estimated by the JT interference scan 818, but is not limited thereto. This element includes the following "Sector Information" in addition to "Element ID".

Each of the "Sector Information #1" (Sector Info. #1) to the "Sector Information #M" (Sector Info. #M) includes information regarding the respective observed precoding vector. Each piece of "Sector Information #i" includes the subfields of "Precoding ID #i" and "Interference Level #i". The "Precoding ID" includes information indicating the observed precoding vector. The "Interference Level" includes information indicating the amount of interference of the observed precoding vector. The "Interference Level" may include, for example, information indicating a signal-to-noise ratio (SNR) in the observed frequency band or the intensity of a received signal.

[JT Interference Feedback]

Figure 10:
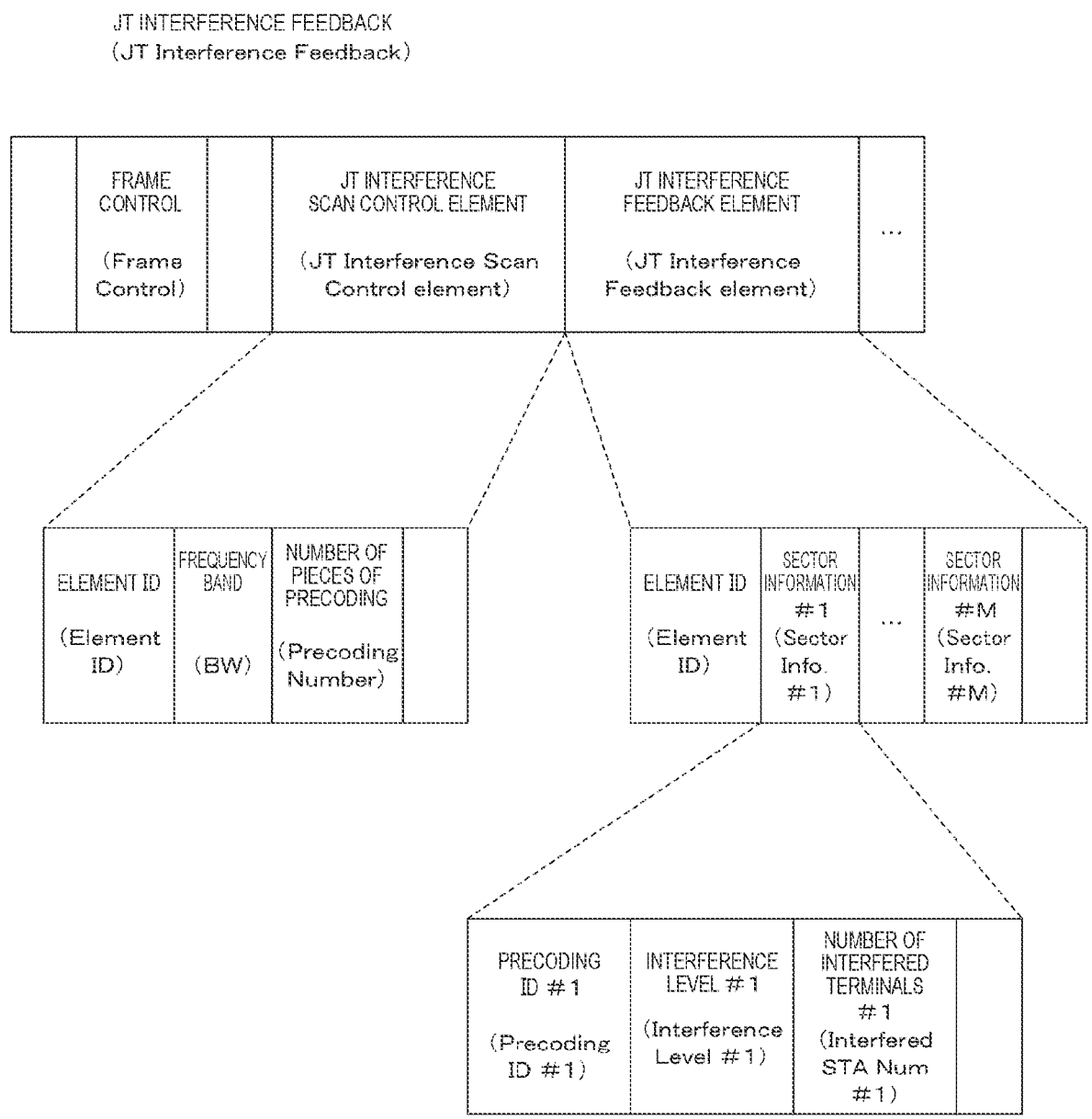
FIG. 10 is a diagram showing a frame configuration example of JT interference feedback 824 in the first embodiment of the present technology.

FIG. 10 is a diagram showing a frame configuration example of JT interference feedback 824 in the first embodiment of the present technology.

The JT interference feedback 824 is used so that the OBSS-AP 203 that has received JT interference reports 823 from OBSS terminals 209 can announce information regarding the amount of interference estimated in all the OBSS terminals 209. This frame includes "Frame Control", "JT Interference Scan Control element", and "JT Interference Feedback element" as shown below, but is not limited thereto.

The "Frame Control" includes information indicating that this frame is a frame announced as the JT interference feedback 824. However, it is not necessary that such information be included in the "Frame Control" alone, and a configuration in which the fact that this frame is the JT interference feedback 824 is indicated by additionally using other information in this frame may be applied. For example, a configuration in which an interpretation can be made by additionally using a value of an arbitrary field in the "JT Interference Scan Control element" may be applied.

The "JT Interference Scan Control element" includes information for estimating each field length in the subsequent "JT Interference Feedback element" in advance, but is not limited thereto. This element includes at least one or more of the fields of "Frequency Band", and "Number of Pieces of Precoding" in addition to "Element ID".

The "Frequency Band" (BW) includes information indicating the frequency band of the estimated amount of interference announced in the subsequent "JT Interference Feedback element". The "Number of Pieces of Precoding" (Precoding Number) includes the number of precoding vectors of the estimated amount of interference announced in the subsequent "JT Interference Feedback element". Note that the "Number of Pieces of Precoding" may include information indicating the number of "Sector Information" fields in the subsequent "JT Interference Feedback element".

The "JT Interference Feedback element", by being combined with the "JT Interference Scan Control element", indicates the amount of interference estimated in all OBSS terminals 209 from which JT interference reports 823 have been transmitted, but is not limited thereto. This element includes "Sector Information" in addition to "Element ID".

Each of the "Sector Information #1" (Sector Info. #1) to the "Sector Information #M" (Sector Info. #M) includes information indicating the estimated amount of interference in all OBSS terminals 209 from which the OBSS-AP 203 has received JT interference reports 823 for an arbitrary precoding vector among the precoding vectors used in the JT interference scan 818. Each "Sector Information #i" field includes "Precoding ID #i", "Interference Level #i", and "Number of Interfered Terminals #i", but the constituent components of the "Sector Information #i" field are not limited thereto.

The "Precoding ID" includes information indicating a precoding vector referred to in the "Sector Information". The "Interference Level" includes information indicating the amount of interference estimated by the OBSS terminal 209 for the precoding vector in question. The "Number of Interfered Terminals" (Interfered STA Num) includes information indicating the number of OBSS terminals 209 of which the estimated amount of interference exceed a certain threshold for the precoding vector in question.

For example, in the "Sector Information #k", the "Precoding ID #k" includes information indicating the k-th column precoding vector in the precoding matrix used in the JT interference scan 818. Further, the "Interference Level #k" includes information indicating the total value of received powers exceeding a certain threshold among the received powers observed with the k-th column precoding vector in OBSS terminals 209. The "Number of Interfered Terminals #k" includes information indicating the number of OBSS terminals 209 of which the received powers observed with the k-th column precoding vector exceed a certain threshold.

[Joint Transmission Setting Announcement]

Figure 11:
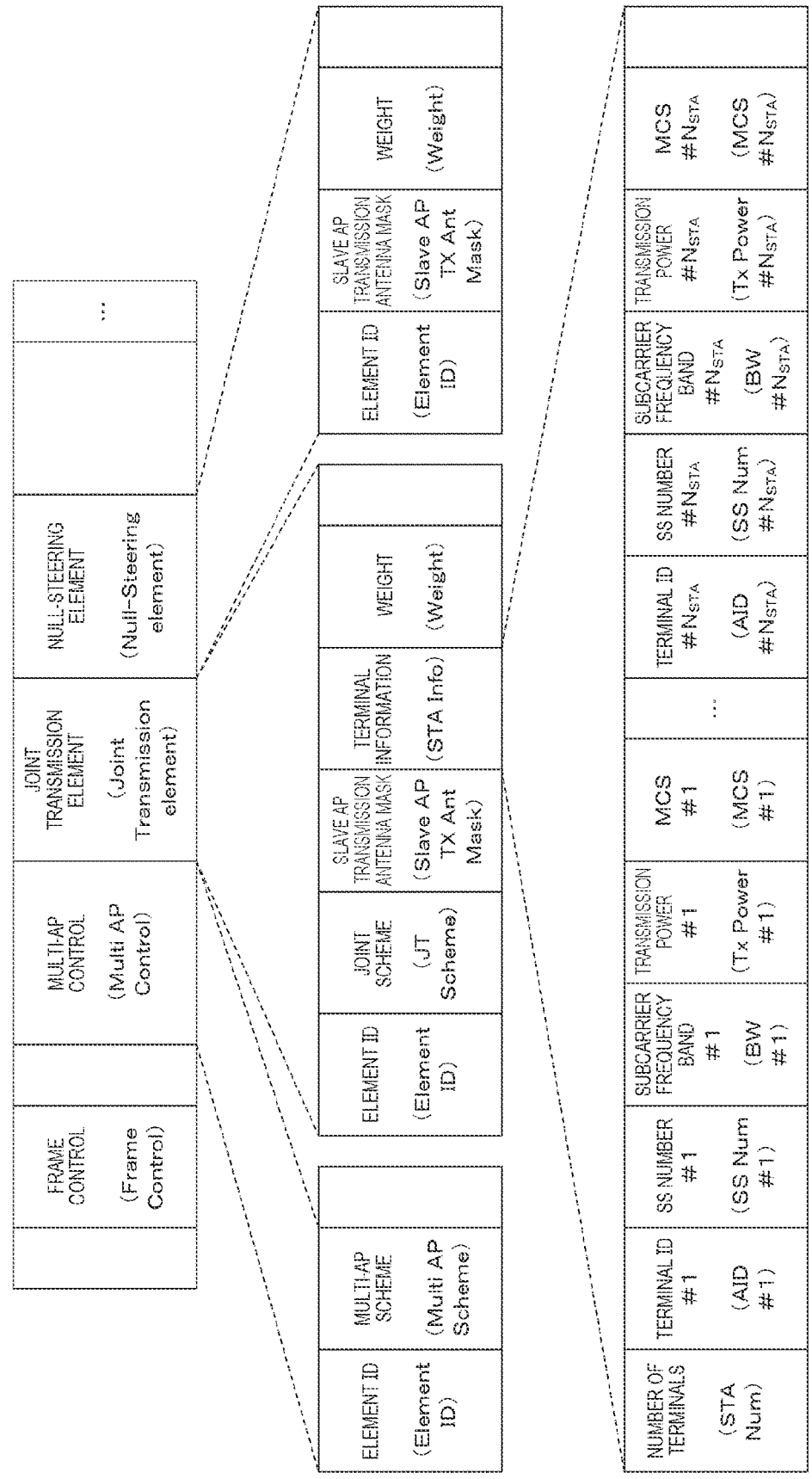
FIG. 11 is a diagram showing a frame configuration example of a joint transmission setting announcement 827 in the first embodiment of the present technology.

FIG. 11 is a diagram showing a frame configuration example of the joint transmission setting announcement 827 in the first embodiment of the present technology.

The joint transmission setting announcement 827 is used so that after the master AP 101 that has received the JT interference feedback 824 from the OBSS-AP 203 determines one or more of a joint scheme in the multiple APs, a weighting factor in a joint scheme, a modulation and coding scheme (MCS), and transmission power on the basis of the received announcement information, the master AP 101 can announce the result to the slave AP 102. Note that the information announced is not limited thereto. This frame includes "Frame Control", "Multi AP Control", "Joint Transmission element", and "Null-Steering element", but does not necessarily need to include all of them. For example, this frame may include either one of the "Joint Transmission element" and the "Null-Steering element" exclusively.

The "Frame Control" includes information indicating that this frame is a frame announced as the joint transmission setting announcement 827. However, it is not necessary that such information be included in the "Frame Control" alone, and a configuration in which the fact that this frame is the joint transmission setting announcement 827 is indicated by additionally using other information in this frame may be applied. For example, a configuration in which an interpretation can be made by additionally using a value of an arbitrary field in the "Multi AP Control" may be applied.

The "Multi AP Control" is used to notify the slave AP 102 of the joint scheme in the multiple APs. Note that the content of announcement by this field is not limited thereto. This field includes the subfield of "Multi AP Scheme", but the constituent components are not limited thereto. Note that the "Multi AP Control" is an example of information regarding the number of joint wireless base stations mentioned in the claims.

The "Multi AP Scheme" includes information indicating the joint scheme of the multiple APs. The "Multi AP Scheme" may include, for example, information indicating that not both of joint transmission and coordinated nulling are implemented or neither of them is implemented.

The "Joint Transmission element" is used to announce a parameter necessary in a case where joint transmission is implemented by the multiple APs. This element includes one or more of the fields of "Joint Scheme", "Slave AP Transmission Antenna Mask", "Terminal Information", and "Weight" in addition to "Element ID", but the constituent components are not limited thereto.

The "Joint Scheme" (JT Scheme) includes information indicating the joint scheme in joint transmission. The "Slave AP Transmission Antenna Mask" (Slave AP Tx Ant Mask) includes information indicating the transmission antenna that the slave AP 102 uses in a case where joint transmission is implemented. The "Terminal Information" (STA Info) includes information regarding the terminal of a destination of transmission by joint transmission in a case where joint transmission is implemented. The "Weight" includes information regarding the weighting factor and the transmission power used in the multiple APs in a case where joint transmission is implemented.

Note that the "Weight" may include information indicating a weighting factor indicated in any format among compressed feedback, non-compressed feedback, and CSI feedback prescribed in IEEE 802.11 and information indicating parameters with which these pieces of information can be calculated as a weighting factor.

Further, the "Terminal Information" may include one or more of the subfields of "Number of Terminals" and information corresponding to each terminal. The information corresponding to each terminal may include, for example, one or more of "Terminal ID", "SS Number", "Subcarrier Frequency Band", "Transmission Power", and "MCS", but is not limited thereto.

The "Number of Terminals" (STA Num) includes information indicating the number of terminals of destinations of transmission by joint transmission. Therefore, the following information includes $N_{STA}$ pieces of information, where $N_{STA}$ corresponds to the "Number of Terminals".

Each of the "Terminal ID #1" (AID #1) to the "Terminal ID #$N_{STA}$" (AID #$N_{STA}$) includes information indicating the respective destination terminal. Each of the "SS Number #1" (SS Num #1) to the "SS Number #$N_{STA}$" (SS Num #$N_{STA}$) includes information indicating the number of the stream allocated to the respective destination terminal. Each of the "Subcarrier Frequency Band #1" (BW #1) to the "Subcarrier Frequency Band #$N_{STA}$" (BW #$N_{STA}$) includes information indicating the frequency band allocated to the respective destination terminal. Each of the "Transmission Power #1" (Tx Power #1) to the "Transmission Power #$N_{STA}$" (Tx Power #$N_{STA}$) includes information indicating the transmission power allocated to the respective destination terminal. Each of the "MCS #1" to the "MCS #$N_{STA}$" includes information indicating the MCS allocated to the respective destination terminal. Note that, for a terminal to which a plurality of streams is allocated, the "MCS" may include information indicating the MCS of each stream.

The fields and the subfields of the "Joint Transmission element" may include information like below.

For example, the "Joint Scheme" may include information indicating which one of coherent joint transmission (CJT) and non-coherent joint transmission (NCJT) to execute. Further, the "Number of Terminals" may include at least one of the pieces of information indicating the numbers ($N_{STA}$) of "Terminal ID" subfields, "SS Number" subfields, and "Subcarrier Frequency Band" subfields. Further, in a case where the "Joint Scheme" includes information indicating that CJT is to be executed, the "Transmission Power" may not be present.

Further, for the k-th terminal of a destination of joint transmission, the "Terminal ID #k" may include a value determined by a MAC address. Further, the "SS Number #k" may include information by which a weighting factor can be obtained by additionally using the "Weight" field. Further, the "Subcarrier Frequency Band #k" may include information indicating the subcarrier allocated in joint transmission. Further, the "Transmission Power #k" may include information indicating the average value of transmission powers allocated to subcarriers individually.

The "Null-Steering element" is used to announce a parameter necessary in a case where null-steering is implemented in the multiple APs. The null-steering is a communication scheme that forms a null for a not-desired communication terminal. This element includes at least one or more of the fields of "Slave AP Transmission Antenna Mask" and "Weight" in addition to "Element ID", but the constituent components are not limited thereto.

The "Weight" includes information indicating a vector that forms a null in a case where null-steering is implemented. The "Slave AP Transmission Antenna Mask" (Slave AP TX Ant Mask) includes information indicating the transmission antenna of the slave AP 102 when applying the vector indicated by the "Weight".

As a specific example, as shown in the following formula, when a vector P indicated by the "Weight" is expressed as a matrix by using p below, a precoding vector w implemented as null-steering in the slave AP 102 may be calculated as follows.

[Math. 4]

$$w \propto \text{max.eigenvector}\{(\sigma_N^2 I + P^H P)^{-1}(H^H H)\}$$ Formula 4

$$\text{s.t. } P = [p_1 p_2 \cdots p_{N_{null}}]$$

Here, in the above formula, H is propagation path information estimated between a desired destination terminal (hereinafter, STA #3) of the slave AP 102 and the slave AP 102. Further, $\sigma_N^2$ represents noise power that can be observed in the STA #3. Further, $A^H$ represents a complex conjugate transposed matrix of the matrix A. Further, "max. eigenvector{A}" represents an eigenvector of the largest eigenvalue among the eigenvectors of the matrix A.

[Processing Procedure]

Figure 12:
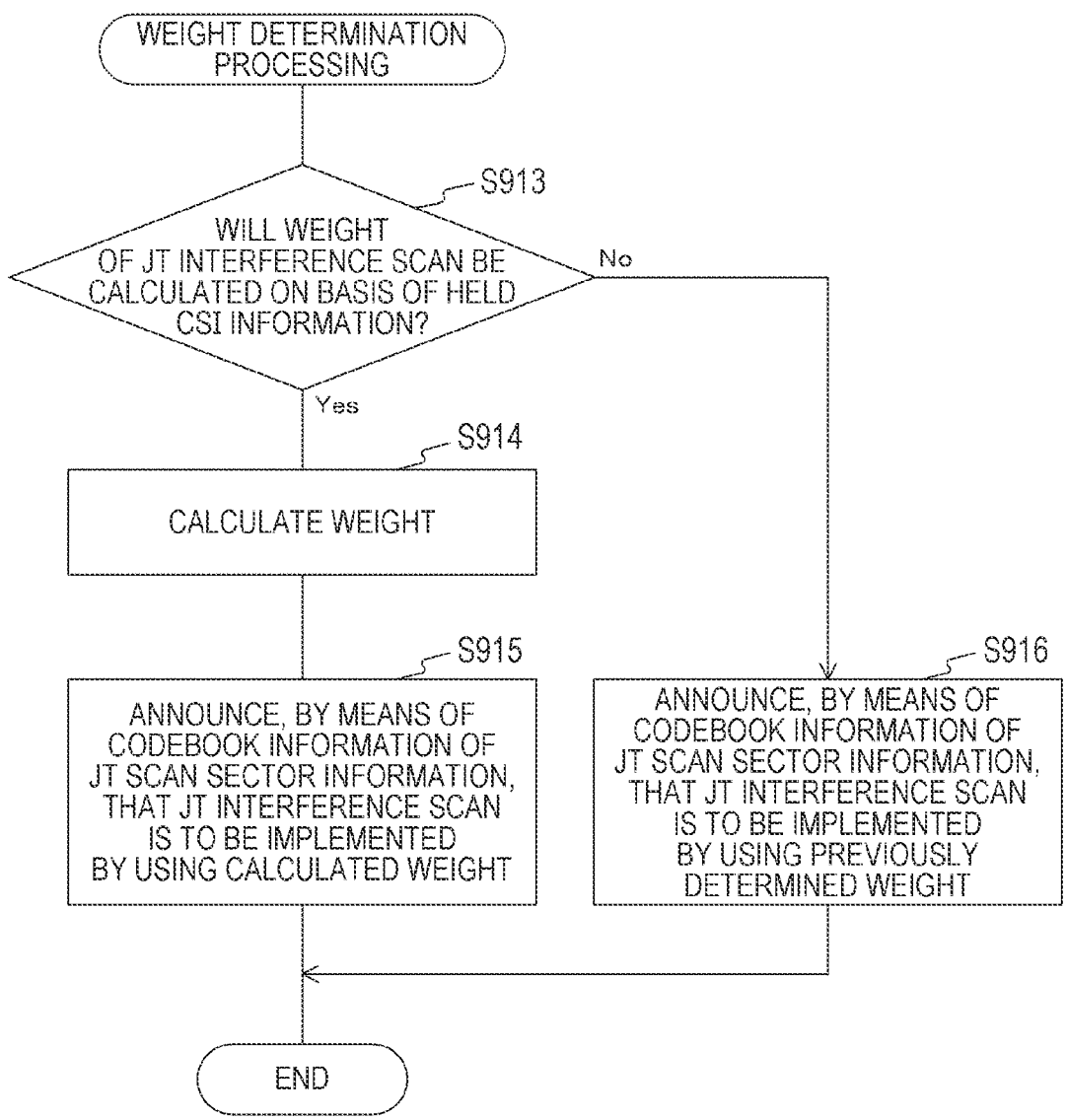
FIG. 12 is a flowchart showing a processing procedure example of weight determination processing in the first embodiment of the present technology.

FIG. 12 is a flowchart showing a processing procedure example of weight determination processing in the first embodiment of the present technology.

Herein, an operation in which the master AP 101 that has received the JT interference scan response 812 from the OBSS-AP 203 and has determined to implement the JT interference scan 818 determines a weight to be announced to the slave AP 102 in the JT scan sector information 813 is shown. The weight determined here corresponds to precoding used in the JT interference scan 818.

The master AP 101 that has determined to execute the JT interference scan 818 starts calculating a precoding matrix to be used in the JT interference scan 818.

First, it is determined whether or not to calculate precoding (a weight) of the JT interference scan on the basis of held channel state information (CSI, or propagation path information) (step S913). That is, it is determined whether or not CSI information between a terminal that can be a destination in the joint transmission 828 and the multiple APs has been obtained and a precoding matrix should be calculated on the basis of the CSI information.

It is supposed that the JT interference scan 818 can be implemented by using a precoding matrix (hereinafter, referred to as known precoding or a codebook) predetermined among the multiple APs separately from CSI information. Hence, whether or not to use known precoding in the JT interference scan 818 may be determined by the implementation time of the JT interference scan 818. For example, in a case where it is determined that the number of precoding vectors for a terminal of a destination in the joint transmission 828 is smaller than the number of known pieces of precoding, it may be determined to use precoding vectors calculated on the basis of CSI information without using known precoding.

In a case where it is determined to use known precoding in the JT interference scan 818 (step S913: No), the master AP 101 stores, in the "Codebook Information" in the JT scan sector information 813, information indicating that known precoding is to be used in the JT interference scan 818 (step S916). Then, information indicating a piece of precoding used in the JT interference scan 818 among known pieces of precoding is stored in the "Sector ID".

On the other hand, in a case where it is determined to implement the JT interference scan 818 by means of precoding calculated by using CSI information (step S913: Yes), the master AP 101 first calculates precoding to be applied in the JT interference scan 818 on the basis of CSI information (step S914). Then, the master AP 101 stores, in the "Codebook Information" in the JT scan sector information 813, information indicating that the JT interference scan 818 is to be performed by using the calculated precoding (step S915).

As a specific example, Q shown below may be applied as precoding, but the precoding is not limited thereto.

[Math. 5]

$$Q = [q_1, q_2, \ldots q_{N_r}], \text{ S.t.} q_i \in \text{eigenvector}\{H^H H\}, i \in [1, 2, \ldots, N_r]$$ Formula 5

H in the above formula is a propagation path matrix obtained by CSI information between the multiple APs and the terminal, and is a matrix having Nr or more columns.

Figure 13:
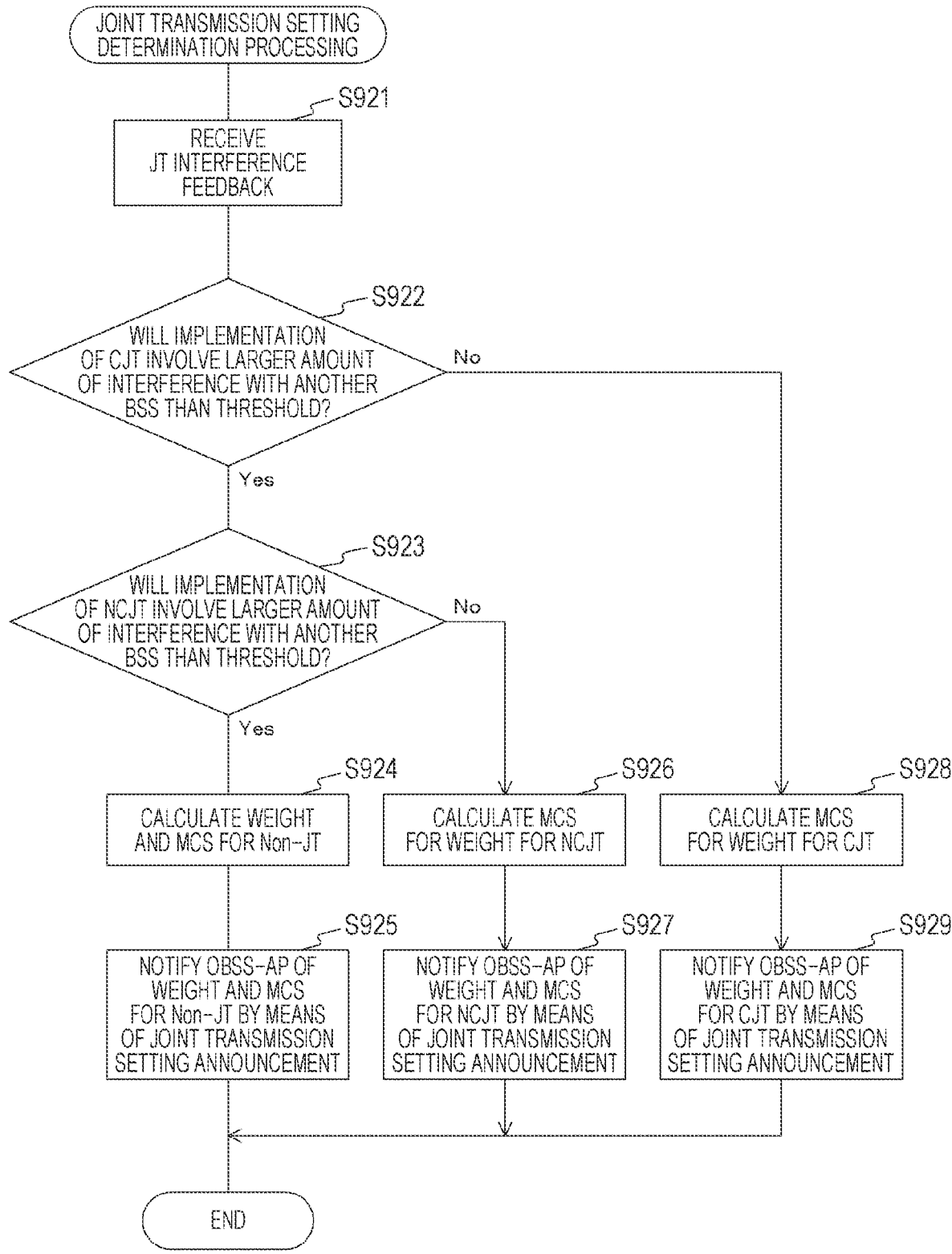
FIG. 13 is a flowchart showing a processing procedure example of joint transmission setting determination processing in the first embodiment of the present technology.

FIG. 13 is a flowchart showing a processing procedure example of joint transmission setting determination processing in the first embodiment of the present technology.

Herein, the master AP 101 that has received the JT interference feedback 824 from the OBSS-AP 203 determines any one of a joint scheme, an MCS, and transmission power of the multiple APs in the joint transmission 828.

The master AP 101 that has received the JT interference feedback 824 determines a joint transmission setting on the basis of the announced information of the estimated amount of interference in the OBSS terminal 209 (step S921).

First, whether or not CJT can be implemented is determined on the basis of whether or not, in a case where CJT is implemented, the amount of interference with the OBSS terminal 209 exceeds a threshold (step S922). Specifically, the amount of interference of the OBSS terminal 209 is estimated for a weight of CJT determined as described later. The weight of CJT may be calculated on the basis of CSI information between the multiple APs and the OBSS terminal 209, and may be obtained by Singular Vector Decomposition (SVD), Minimize Maximum Square Error (MMSE), the water filling theorem, or the like. Note that the weight is expressed by a complex number, and the norm of the weight means transmission power.

In a case where it is determined to implement CJT (step S922: No), an MCS is calculated for the weight of CJT (step S928), and the weight of CJT and the MCS are announced to the slave AP 102 by the joint transmission setting announcement 827 (step S929).

On the other hand, in a case where it is determined not to implement CJT (step S922: Yes), it is determined whether or not NCJT can be implemented (step S923). Specifically, as described later, a weight of NCJT is determined, and the amount of interference of the OBSS terminal 209 for the weight is estimated. In a case where it is determined to implement NCJT (step S923: No), an MCS is calculated for the weight of NCJT (step S926), and the weight of NCJT and the MCS are announced to the slave AP 102 by the joint transmission setting announcement 827 (step S927).

In a case where it is determined not to implement NCJT (step S923: Yes), it is determined that the joint transmission 828 is to be implemented by non-joint transmission (non-JT). Note that also in non-JT, a scheme of non-JT is determined including whether or not to implement coordinated nulling.

As to whether or not coordinated nulling can be implemented, the following method may be used: the number of reception antennas of all destination terminals used in the joint transmission 828 and the total number of transmission antennas of the multiple APs are compared; in a case where the total number of transmission antennas of the multiple APs is larger, coordinated nulling is implemented; in other cases, precoding calculated by Zero Forcing (ZF), Minimize Maximum Square Error (MMSE), or the like is used.

In a case where it is determined to implement Non-JT (step S923: Yes), an MCS is calculated for the weight of Non-JT (step S924), and the weight of Non-JT and the MCS are announced to the slave AP 102 by the joint transmission setting announcement 827 (step S925).

As a specific example of the above-described determination of whether or not CJT or NCJT can be implemented, the determination can be made as follows. Herein, the value of the total amount of interference of OBSS terminals 209 for, among the precoding vectors implemented in the JT interference scan 818, the k-th precoding vector that has been precoded in a cooperative manner among the multiple APs is represented by $I_{CJT}^{(k)}$. Further, the value of the total amount of interference of OBSS terminals 209 for the l-th precoding vector of the m-th access point that, without cooperation among the multiple APs, has been precoded in a time division manner in units of individual access points included in the multiple APs is represented by $I_{NCJT}^{(m,l)}$. Further, the thresholds are represented by $I_{Thr}$ and $I_{Thr}'$. Note that each of $I_{CJT}^{(k)}$ and $I_{NCJT}^{(m,l)}$ is information indicated by the "Sector Information" field in the JT interference feedback 824 from the OBSS-AP 203.

As a criterion for implementing CJT, it may be determined to implement CJT when the following is satisfied.

[Math. 6]

Formula 6

$$\max\left[\sum_{j}|a_{i,j}|^2\right] > I_{Thr} \text{ s.t. } \{a_{i,j}\} = $$

$$A = \text{diag}[I_{CJT}^{(l)} \ \ldots \ I_{CJT}^{(Nr)}] \begin{bmatrix} q_{CJT}^{(1)H} \\ \vdots \\ q_{CJT}^{(N_r)H} \end{bmatrix} W_{CJT}$$

Here, $W_{CJT}$ represents a precoding matrix in a case where CJT is implemented. Further, diag[ ] represents a diagonal matrix in which each element is a diagonal component. Further, $N_T$ is the maximum value of k announced by the JT interference scan 818.

Further, as another example, it may be determined to implement CJT when the following formula is satisfied instead of the above formula.

[Math. 7]

Formula 7

$$\sum_{i,j}|a_{i,j}|^2 > I_{Thr} \text{ s.t. } \{a_{i,j}\} = $$

$$A = \text{diag}[I_{CJT}^{(l)} \ \ldots \ I_{CJT}^{(Nr)}] \begin{bmatrix} q_{CJT}^{(1)H} \\ \vdots \\ q_{CJT}^{(N_r)H} \end{bmatrix} W_{CJT}$$

As a criterion for implementing NCJT, it may be determined to implement NCJT when the following is satisfied.

[Math. 8]

Formula 8

$$\max\left[\sum_{m,j}|b_{i,j}^{(m)}|^2\right] > I_{Thr} \text{ s.t. } \{b_{i,j}^{(m)}\} = $$

$$B^{(m)} = \text{diag}[I_{NCJT}^{(m,1)} \ \ldots \ I_{CJT}^{(m,N_T(m))}] \begin{bmatrix} q_{CJT}^{(1)H} \\ \vdots \\ q_{CJT}^{(N_T)H} \end{bmatrix} W_{NCJT}^{(m)}$$

Here, $W_{NCJT}^{(m)}$ represents a precoding matrix of the m-th access point included in the multiple APs in a case where NCJT is implemented. Further, $N_T^{(m)}$ is the maximum value of l in the m-th access point announced by the JT interference scan 818.

Further, as another example, it may be determined to implement NCJT when the following formula is satisfied instead of the above formula.

[Math. 9]

Formula 9

$$\sum_{m,i,j} |b_{i,j}^{(m)}|^2 > I_{Thr} \text{ s.t. } \{b_{i,j}^{(m)}\} =$$

$$B^{(m)} = \text{diag}\left[I_{NCJT}^{(m,1)} \ldots I_{CJT}^{(m,N_T(m))}\right] \begin{bmatrix} q_{CJT}^{(1)H} \\ \vdots \\ q_{CJT}^{(N_T)H} \end{bmatrix} W_{NCJT}^{(m)}$$

Note that the criteria for implementing CJT or NCJT shown in the above formulae are examples of a predetermined criterion mentioned in the claims.

Thus, according to the first embodiment of the present technology, interference caused by joint transmission can be estimated in the OBSS terminal 209 by transmitting a reference signal (TRN) at the time of the JT interference scan 818.

2. Second Embodiment

In the first embodiment described above, it is supposed that CSI information has already been obtained; in a second embodiment described here, it is supposed that CSI information of the wireless terminal 109 is estimated at the time of the JT interference scan 818. Note that the configurations of the wireless network system and the wireless communication apparatus are similar to those of the first embodiment described above, and thus a detailed description thereof is omitted.

[Operation]

Figure 14:
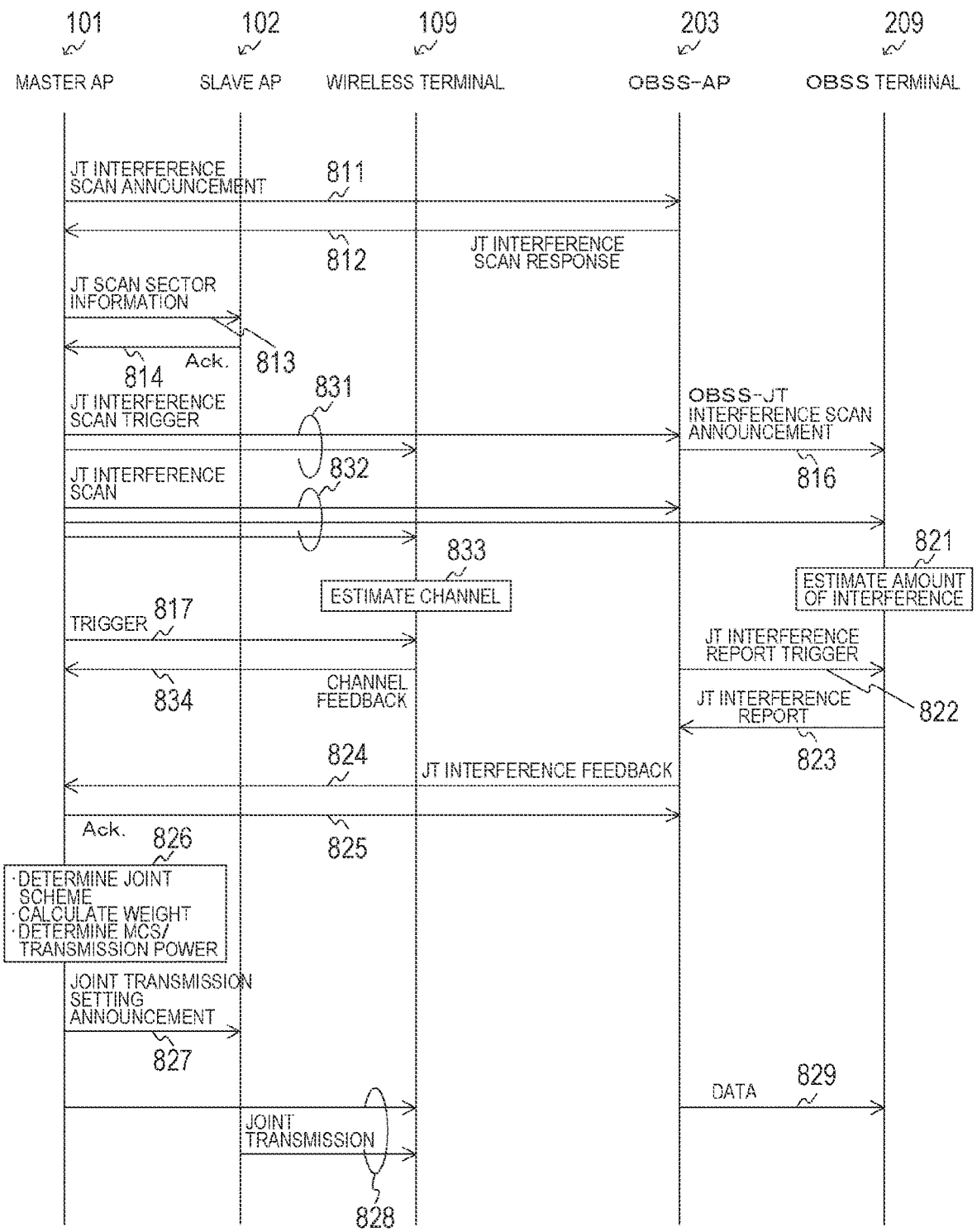
FIG. 14 is a sequence diagram showing an operation example of a wireless network system in a second embodiment of the present technology.

FIG. 14 is a sequence diagram showing an operation example of a wireless network system in a second embodiment of the present technology.

The operation in the second embodiment is basically similar to that in the first embodiment described above, but differs in the following points.

[JT Interference Scan Trigger]

In a case where the master AP 101 that has received Ack 814 from the slave AP 102 has determined that now it is near the start time of interference measurement, the master AP, when executing, on the OBSS-AP 203, a JT interference scan trigger indicating that interference measurement is to be implemented, transmits such a trigger also to the wireless terminal 109. The frame announced by the JT interference scan trigger 831 is similar to that in the first embodiment described above, but the wireless terminal 109 that has received the JT interference scan trigger 831 is set such that propagation path information can be estimated at the time at which a JT interference scan 832 is announced. The time at which the JT interference scan 832 is announced is determined by information included in the "Scan Start Time" in the JT interference scan trigger 831.

[JT Interference Scan]

After the JT interference scan trigger 831 indicating that interference measurement is to be implemented is executed on the OBSS-AP 203, the multiple APs that have determined that now it is time to start interference measurement announce the JT interference scan 832 to, in addition to the OBSS terminal 209 of the first embodiment described above, the wireless terminal 109 in the second embodiment.

The wireless terminal 109 that has received a reference signal from the multiple APs by means of the JT interference scan 832 estimates propagation path (channel) information (833). Further, unlike in the OBSS terminal 209, although propagation path information may be estimated for each piece of precoding, propagation path information may be estimated on the basis of "EHT-LTF", which is a reference signal section to which precoding is not applied.

[Channel Feedback]

The wireless terminal 109 to which the JT interference scan 832 has been announced from the multiple APs notifies the multiple APs of the estimated propagation path information by means of channel feedback 834. The timing of the channel feedback 834 may be determined on the basis of the reception of the JT interference scan trigger 831, or the channel feedback 834 may be implemented when it is determined that the JT interference scan 832 is ended.

[Frame Configuration]

In the following, the configurations of the frames added in the second embodiment are described in detail.

[JT Interference Scan Trigger]

Figure 15:
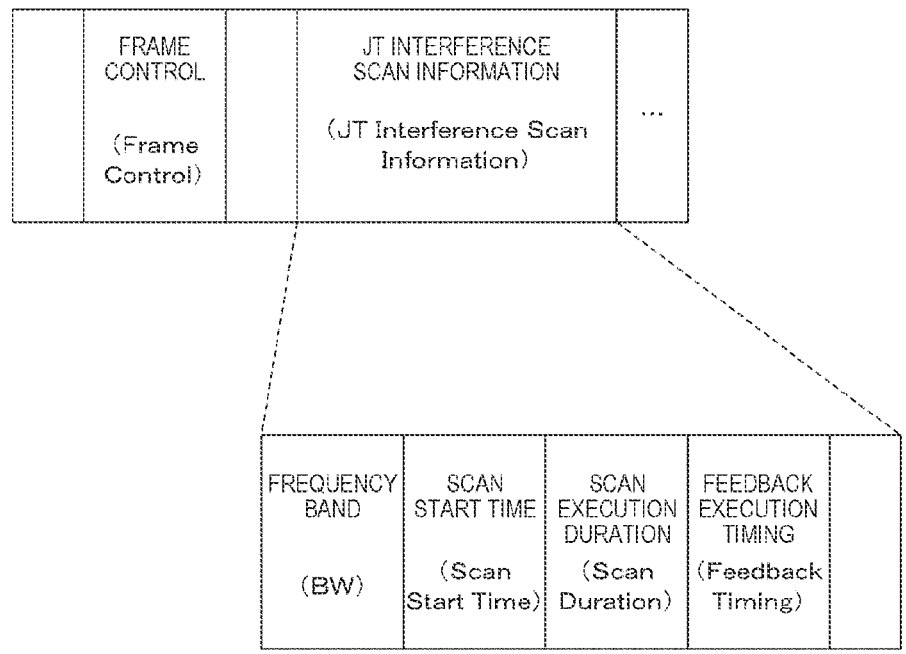
FIG. 15 is a diagram showing a frame configuration example of a JT interference scan trigger 831 in the second embodiment of the present technology.

FIG. 15 is a diagram showing a frame configuration example of the JT interference scan trigger 831 in the second embodiment of the present technology.

The frame of the JT interference scan trigger 831 in the second embodiment is basically similar to the JT interference scan trigger 815 in the first embodiment described above. However, in a case where, unlike in the first embodiment, channel estimation of the wireless terminal 109 is performed simultaneously with the estimation of the amount of interference of the OBSS terminal 209 by the JT interference scan trigger 831, the value indicated by the "Frame Control" may be different from that in a case where only the estimation of the amount of interference of the OBSS terminal 209 is performed. This is because in a case where the frame announced by the JT interference scan trigger 831 does not include information for determining whether or not the wireless terminal 109 should perform channel estimation, it is necessary to notify the wireless terminal 109 by means of the immediately preceding JT interference scan trigger 831 that channel estimation is to be performed by the subsequent JT interference scan 832. Note that a configuration in which, by combining the "Frame Control" and other information in this frame, the wireless terminal 109 can understand that channel estimation is to be performed by the subsequent JT interference scan 832 may be applied.

Further, in the "JT Interference Scan Information", "Feedback Execution Time" (Feedback Timing) is added as compared to the first embodiment described above. The "Feedback Execution Time" includes information indicating, to the wireless terminal 109, the time to execute the channel feedback 834. The "Feedback Execution Time" may include information indicating that the feedback is to be executed after a lapse of a certain period of time from when the "JT Interference Scan Information" is ended or information indicating that the feedback is to be executed after a trigger 817 is announced from the multiple APs.

[Channel Feedback]

Figure 16:
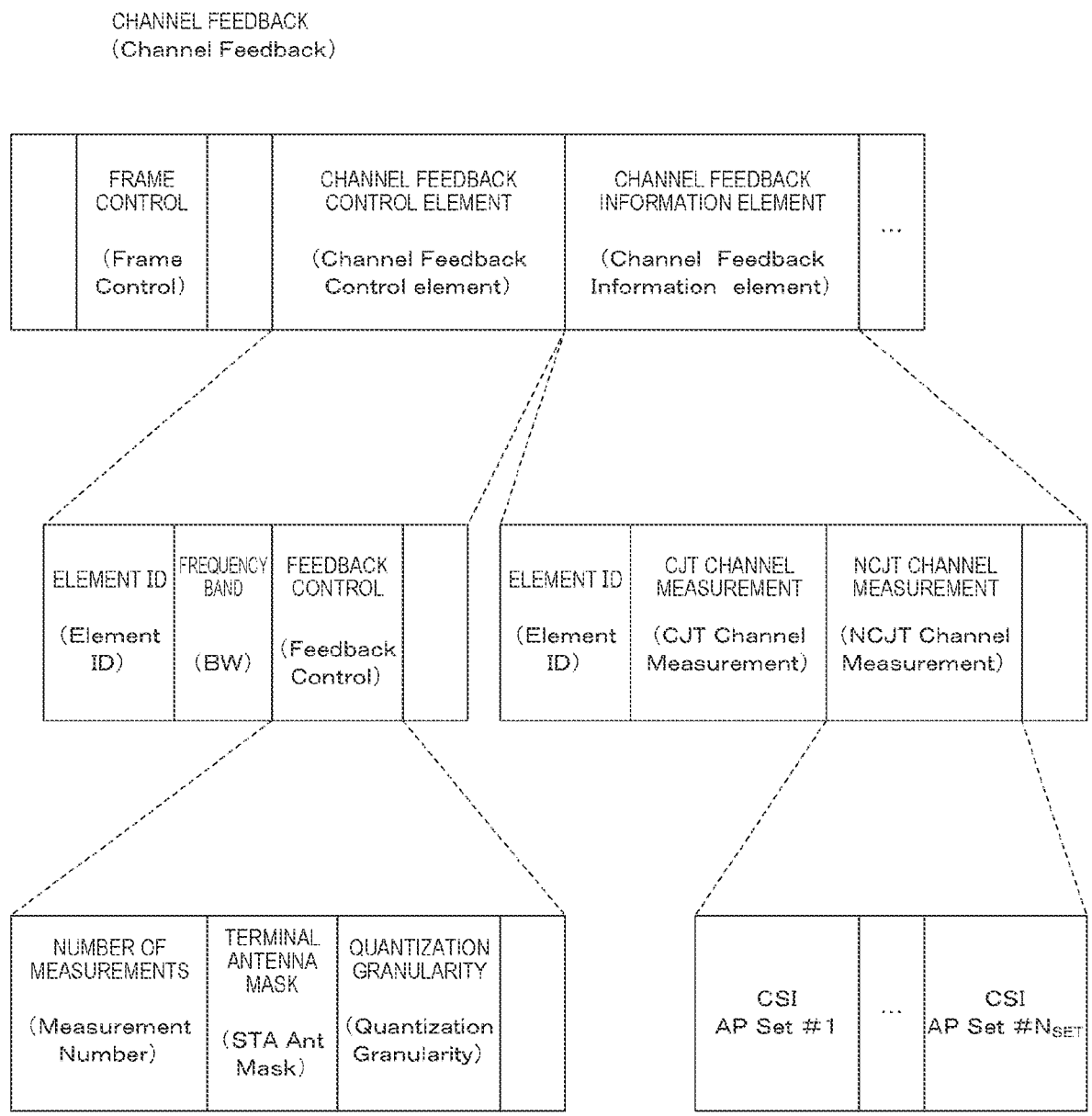
FIG. 16 is a diagram showing a frame configuration example of channel feedback 834 in the second embodiment of the present technology.

FIG. 16 is a diagram showing a frame configuration example of channel feedback 834 in the second embodiment of the present technology.

The frame of the channel feedback 834 is used when announcing, from the wireless terminal 109 to the multiple APs, propagation path information estimated by the JT interference scan 832. This frame includes "Frame Control", "Channel Feedback Control element", and "Channel Feedback Information element", but the constituent components are not limited thereto. Further, each element does not necessarily need to be defined independently, and may be combined with another constituent component and defined as one element.

The "Frame Control" includes information indicating that this frame is a frame announced as the channel feedback 834. However, it is not necessary that such information be included in the "Frame Control" alone, and a configuration in which the fact that this frame is a frame to be notified as the channel feedback 834 is indicated by additionally using other information in this frame may be applied. For example, a configuration in which an interpretation can be made by additionally using a value of an arbitrary field in the "Channel Feedback Control element" may be applied.

The "Channel Feedback Control element" includes information for estimating each field length in the subsequent "Channel Feedback Information element" in advance, but is not limited thereto. This element includes at least one or more of the pieces of information of "Frequency Band", and "Feedback Control" in addition to "Element ID".

The "Frequency Band" (BW) includes information indicating the frequency band of the estimated propagation path information. The "Feedback Control" includes information indicating the format, etc. of propagation path information included in the subsequent "Channel Feedback Information element". The "Feedback Control" includes at least one or more of the subfields of "Number of Rounds of Measurement", "Terminal Antenna Mask", and "Quantization Granularity".

The "Number of Rounds of Measurement" (Measurement Number) includes information indicating that the estimated propagation path information includes propagation path information estimated in a case where the multiple APs have cooperatively performed transmission or propagation path information estimated in units of individual access points included in the multiple APs, or includes both. The "Terminal Antenna Mask" (STA Ant Mask) includes information indicating the reception antenna of the wireless terminal 109 used to estimate propagation path information. The "Quantization Granularity" includes information indicating how many bits of information each numerical value included in precoding is expressed by.

Note that the multiple APs that have received the channel feedback 834 may determine whether or not "CJT Channel Measurement" or "NCJT Channel Measurement", or both are present in the subsequent "Channel Feedback Information element" on the basis of information stored in the "Number of Rounds of Measurement". Further, in a case where it is indicated that propagation path information estimated in units of individual access points included in the multiple APs is included, also information indicating the access points used in the estimation may be included.

The "Channel Feedback Information element", by being combined with the "Channel Feedback Control element", indicates propagation path information estimated by the JT interference scan 832. Note that the information included in the "Channel Feedback Information element" is not limited thereto. This element includes at least one or more of the pieces of information of "CJT Channel Measurement" and "NCJT Channel Measurement" in addition to "Element ID".

The "CJT Channel Measurement" includes propagation path estimation information for a reference signal that the multiple APs that have implemented the JT interference scan 832 have cooperatively transmitted; for example, may include propagation path estimation information related to a JT interference scan 832 implemented in accordance with formula 2. The "NCJT Channel Measurement" includes propagation path estimation information for reference signals that the multiple APs that have implemented the JT interference scan 832 have transmitted in units of individual access points included in the multiple APs; for example, may include propagation path estimation information related to a JT interference scan 832 implemented in accordance with formula 3. The "NCJT Channel Measurement" includes the subfields of "CSI AP Set #1" to "CSI AP Set #$N_{SET}$".

Each of the "CSI AP Set #1" to the "CSI AP Set #$N_{SET}$" includes propagation path estimation information for an arbitrary combination of access points included in the multiple APs and information indicating the combination. The information indicating a combination of access points may not be included. For example, the information indicating a combination of access points may not be included in a case where it is indicated in the "Channel Feedback Information element" that each "CSI AP Set" includes propagation path estimation information obtained in units of individual access points included in the multiple APs.

[Processing Procedure]

Figure 17:
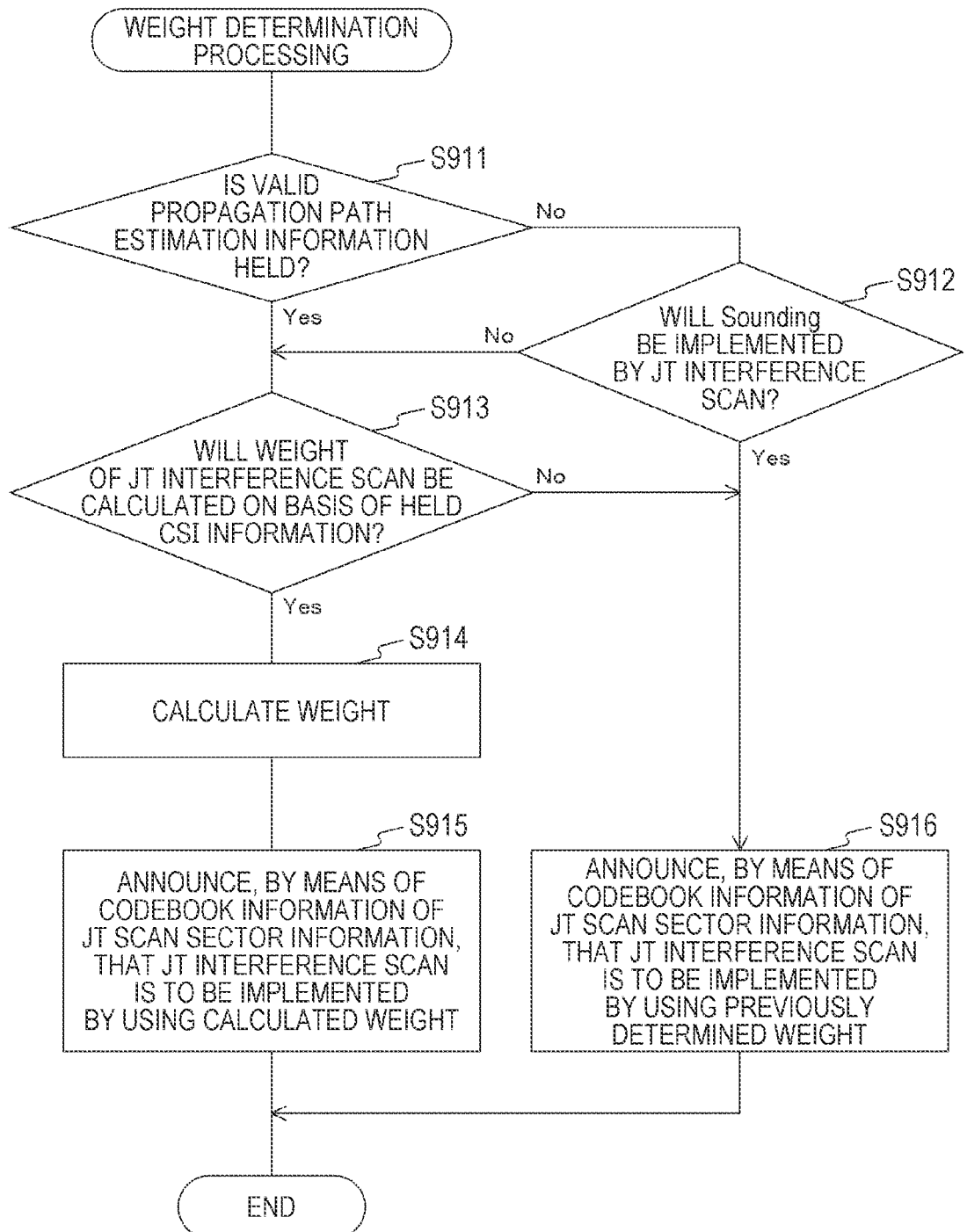
FIG. 17 is a flowchart showing a processing procedure example of weight determination processing in the second embodiment of the present technology.

FIG. 17 is a flowchart showing a processing procedure example of weight determination processing in the second embodiment of the present technology.

The master AP 101 that has determined to execute the JT interference scan 832 starts calculating a precoding to be used in the JT interference scan 832.

Here, it is determined whether or not valid propagation path estimation information between a wireless terminal 109 that can be a destination in joint transmission and the multiple APs is held. Specifically, it is determined whether or not no propagation path estimation information is held or whether or not the held propagation path estimation information was acquired a certain period of time or more ago (step S911).

In a case where it is determined that valid propagation path estimation information is not held (step S911: No), it is determined whether or not to implement, on the wireless terminal 109, the estimation (sounding) of propagation path information by the JT interference scan 832 (step S912).

In a case where sounding is to be implemented (step S912: Yes), the slave AP 102 is notified by the JT scan sector information 813 that sounding is to be implemented by using known precoding in the JT interference scan 832 (step S916).

On the other hand, in a case where it is determined that sounding is not to be implemented by the JT interference scan 832 (step S912: No), it is determined whether or not to implement the JT interference scan 832 by using known precoding (step S913). The subsequent operation is similar to that of the first embodiment described above.

Thus, according to the second embodiment of the present technology, by transmitting the JT interference scan 832 also to the wireless terminal 109, channel estimation can be performed in the wireless terminal 109 in parallel with interference estimation in the OBSS terminal 209.

3. Third Embodiment

In the first embodiment described above, it is supposed that the JT interference scan 818 is implemented with the JT interference scan announcement 811 from the multiple APs as an opportunity; in a third embodiment described here, it is supposed that the OBSS-AP 203 first notifies the multiple APs. Note that the configurations of the wireless network system and the wireless communication apparatus are similar to those of the first embodiment described above, and thus a detailed description thereof is omitted.

[Operation]

Figure 18:
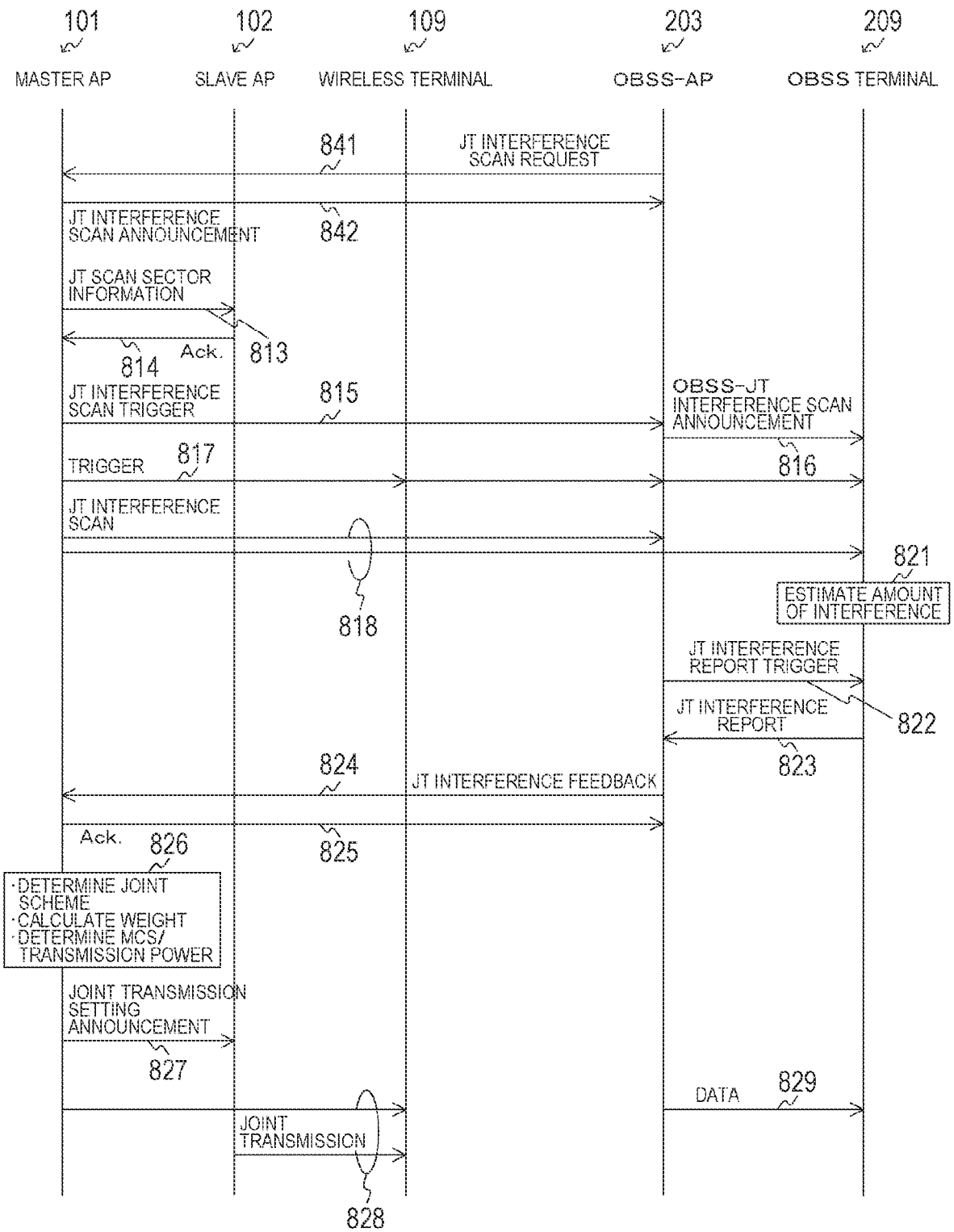
FIG. 18 is a sequence diagram showing an operation example of a wireless network system in a third embodiment of the present technology.

FIG. 18 is a sequence diagram showing an operation example of a wireless network system in a third embodiment of the present technology.

The operation in the third embodiment is basically similar to that in the first embodiment described above, but differs in the following points.

[JT Interference Scan Request]

First, the OBSS-AP 203 implements, on the multiple APs, a JT interference scan request 841 that requests the execution of the JT interference scan 818. At this time, information indicating a start time and an execution period of interference measurement requested by the OBSS-AP 203 may be included in the announcement. The JT interference scan request 841 is announced to at least one of the master AP 101 or the slave AP 102 among the multiple APs. Note that the JT interference scan request 841 is an example of a communication section mentioned in the claims.

Note that in a case where the JT interference scan request 841 has been announced only to the slave AP 102, the slave AP 102 may notify the master AP 101 of information indicating that the JT interference scan request 841 has been announced from the OBSS-AP 203. Further, information indicating that the slave AP 102 and the master AP 101 are to exchange each other's roles may be announced, and the roles of the slave AP 102 and the master AP 101 may be exchanged.

For example, in a case where the OBSS-AP 203 recognizes the presence of the multiple APs and the quality of transmission to the OBSS terminal 209 is determined to be poor, or in a case where the OBSS-AP 203 recognizes the presence of the multiple APs and the received power of a signal transmitted by the multiple APs is higher than a threshold, the OBSS-AP 203 may operate to execute the JT interference scan request 841.

[JT Interference Scan Announcement]

In a case where the JT interference scan request 841 has been executed from the OBSS-AP 203, the multiple APs execute, on the OBSS-AP 203, a JT interference scan announcement 842 regarding the start time and the execution period for executing interference measurement. Note that the information announced is not limited thereto.

Although this example shows a case where the master AP 101 executes the JT interference scan announcement 842 on the OBSS-AP 203, the JT interference scan announcement 842 may be executed by the slave AP 102 or the multiple APs (both the master AP 101 and the slave AP 102) instead of the master AP 101.

[Frame Configuration]

In the following, the configurations of the frames added in the third embodiment are described in detail.

[JT Interference Scan Request]

Figure 19:
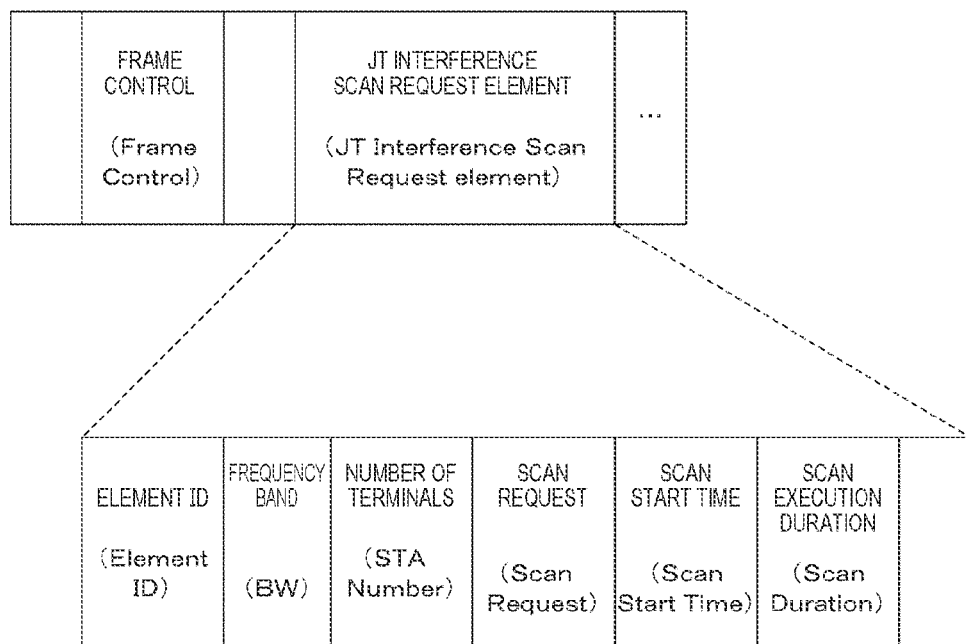
FIG. 19 is a diagram showing a frame configuration example of a JT interference scan request 841 in the third embodiment of the present technology.

FIG. 19 is a diagram showing a frame configuration example of the JT interference scan request 841 in the third embodiment of the present technology.

The frame of the JT interference scan request 841 is a frame with which the OBSS-AP 203 requests the multiple APs to announce, from the multiple APs to the OBSS-AP 203, a request to implement interference measurement and a request for the start time and the execution period of interference measurement. This frame includes "Frame Control" and "JT Interference Scan Request element", but the constituent components are not limited thereto.

The "Frame Control" includes information indicating that this frame is a frame announced as the JT interference scan request 841. However, it is not necessary that such information be included in the "Frame Control" alone, and a configuration in which the fact that this frame is the JT interference scan request 841 is indicated by additionally using other information in this frame may be applied. For example, a configuration in which an interpretation can be made by additionally using a value of an arbitrary field in the "JT Interference Scan Request element" may be applied.

The "JT Interference Scan Request element" includes information regarding a start time and an execution time of interference measurement that the OBSS-AP 203 requests of the multiple APs. This element includes at least one or more of the fields of "Frequency Band", "Number of Terminals", "Scan Request", "Scan Start Time", and "Scan Execution Period" in addition to "Element ID".

The "Frequency Band" (BW) includes information in which the OBSS-AP 203 presents, to the multiple APs, a request value of the bandwidth used when implementing interference measurement. The "Number of Terminals" (STA Number) includes information regarding the number of OBSS-APs 203. The "Scan Request" includes information indicating that it is the JT interference scan request 841. The "Scan Start Time" includes information regarding an execution start time of the JT interference scan 818 that the OBSS-AP 203 requests of the multiple APs. The "Scan Execution Period" (Scan Duration) includes information regarding an execution period of the JT interference scan 818 that the OBSS-AP 203 requests of the multiple APs.

[JT Interference Scan Announcement]

Figure 20:
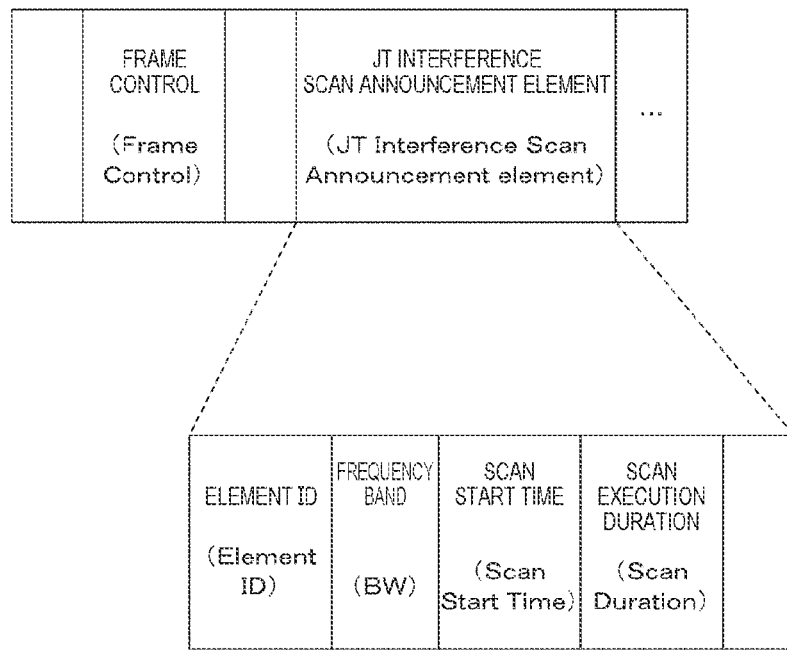
FIG. 20 is a diagram showing a frame configuration example of a JT interference scan announcement 842 in the third embodiment of the present technology.

FIG. 20 is a diagram showing a frame configuration example of the JT interference scan announcement 842 in the third embodiment of the present technology.

The frame of the JT interference scan announcement 842 is used when the multiple APs on which the JT interference scan request 841 has been implemented from the OBSS-AP 203 announce information regarding the JT interference scan 818, such as the start time and the execution period of the JT interference scan 818 implemented later, on the basis of information announced to the OBSS-AP 203. This frame includes "Frame Control" and "JT Interference Scan Announcement element", but the constituent components are not limited thereto.

The "Frame Control" includes information indicating that this frame is a frame announced as the JT interference scan announcement 842. However, it is not necessary that such information be included in the "Frame Control" alone, and a configuration in which the fact that this frame is the JT interference scan announcement 842 is indicated by additionally using other information in this frame may be applied. For example, a configuration in which an interpretation can be made by additionally using a value of an arbitrary field in the "JT Interference Scan Announcement element" may be applied.

The "JT Interference Scan Announcement element" includes information regarding a start time and an execution time of interference measurement that the OBSS-AP 203 requests of the multiple APs. This element includes at least one or more of the fields of "Frequency Band", "Scan Start Time", and "Scan Execution Period" in addition to "Element ID", but the constituent components are not limited thereto.

The "Frequency Band" (BW) includes information indicating the bandwidth used when the multiple APs implement interference measurement on the OBSS-AP 203. The "Scan Start Time" includes information regarding the execution start time of the JT interference scan 818 of the multiple APs. The "Scan Execution Period" (Scan Duration) includes information regarding the execution period of the JT interference scan 818 of the multiple APs.

Thus, according to the third embodiment of the present technology, the JT interference scan 818 can be performed with the JT interference scan request 841 from the OBSS-AP 203 as an opportunity.

Note that the above embodiments show examples for embodying the present technology, and the matters in the embodiments and the invention-defining matters in the claims have respective correspondence relationships. Similarly, the invention-defining matters in the claims and the matters given the same names as these in the embodiments of the present technology have respective correspondence relationships. However, the present technology is not limited to the embodiments, and may be embodied by making various modifications to the embodiments without departing from the gist of the present technology.

Further, each of the processing procedures described in the above embodiments may be grasped as a method including these series of steps, or may be grasped as a program for causing a computer to execute these series of steps or a recording medium storing the program. As the recording medium, for example, a compact disc (CD), a MiniDisc (MD), a digital versatile disc (DVD), a memory card, a Blu-ray (registered trademark) disc, or the like may be used.

Note that the effects described in the present specification are only examples and are not limitative ones, and there may be other effects.

Additionally, the present technology may also be configured as below.

(1) A wireless base station including:

a wireless control section that generates and transmits a reference signal for estimating interference that is, when performing joint transmission with a joint wireless base station, given to a wireless terminal connected to another wireless base station and determines a setting regarding the joint transmission in accordance with a result of estimation of the interference based on the reference signal; and a communication section that transmits the reference signal to the another wireless base station or the wireless terminal and announces the setting regarding the joint transmission to the joint wireless base station.

(2) The wireless base station according to the (1), in which the wireless control section inquires of the another wireless base station whether or not measurement for estimation of the interference can be performed prior to transmission of the reference signal.

(3) The wireless base station according to the (1) or (2), in which the wireless control section generates information regarding precoding of the reference signal, and the communication section transmits the information regarding precoding of the reference signal to the joint wireless base station.

(4) The wireless base station according to the (3), in which the information regarding precoding includes information regarding a frequency at which the reference signal is used.

(5) The wireless base station according to the (3) or (4), in which the information regarding precoding includes information regarding a codebook predetermined with the joint wireless base station.

(6) The wireless base station according to any one of the (3) to (5), in which the information regarding precoding includes information regarding a weighting factor to be calculated to the reference signal.

(7) The wireless base station according to any one of the (3) to (6), in which the information regarding precoding includes information regarding a time offset for the joint wireless base station at a time of transmission of the reference signal.

(8) The wireless base station according to the (7), in which the information regarding precoding includes at least one of pieces of information indicating presence or absence of the time offset or information indicating the time offset.

(9) The wireless base station according to any one of the (1) to (8), in which the wireless control section, prior to transmission of the reference signal, generates information indicating that measurement for estimation of the interference is to be implemented, and the communication section transmits, to the another wireless base station, the information indicating that measurement for estimation of the interference is to be implemented.

(10) The wireless base station according to the (9), in which the information indicating that measurement for estimation of the interference is to be implemented includes information regarding a time to transmit the reference signal, an implementation period of the measurement, and a frequency at which the measurement is implemented.

(11) The wireless base station according to any one of the (1) to (10), in which the wireless control section determines a joint parameter including at least one of a joint transmission scheme, precoding, an encoding scheme, or transmission power in the joint transmission on the basis of a result of estimation of the interference from the another wireless base station.

(12) The wireless base station according to the (11), in which the joint parameter is determined on the basis of a predetermined criterion.

(13) The wireless base station according to any one of the (1) to (12), in which the reference signal includes information for estimating a propagation path between the wireless base station and a wireless terminal connected to the wireless base station, and the communication section transmits the reference signal to the wireless terminal connected to the wireless base station.

(14) The wireless base station according to any one of the (1) to (13), in which the setting of the joint transmission announced by the joint transmission setting announcement section includes information regarding a number of the joint wireless base stations.

(15) The wireless base station according to the (14), in which the setting of the joint transmission announced by the communication section further includes at least one of information regarding a joint transmission scheme in the joint transmission, information regarding a transmission antenna to be used in the joint wireless base station, information regarding the wireless terminal of a destination in the joint transmission, or information regarding precoding of the wireless terminal of a destination in the joint transmission.

(16) The wireless base station according to the (15), in which the information regarding precoding of the wireless terminal of a destination in the joint transmission includes information regarding a number of the wireless terminals of destinations, information that identifies the wireless terminal of a destination, and information regarding a frequency, an encoding scheme, transmission power, and a stream to be used in the joint transmission.

(17) A wireless base station including:

a wireless control section that acquires, from a wireless terminal, information regarding interference with the wireless terminal caused by joint transmission, the interference having been estimated by using a reference signal supplied from any one of a plurality of wireless base stations that performs the joint transmission, and generates overall interference information on the basis of the acquired information regarding the interference; and a communication section that transmits the overall interference information to any one of the plurality of wireless base stations that performs the joint transmission.

(18) The wireless base station according to the (17), in which the communication section requests each of the plurality of wireless base stations that performs the joint transmission to transmit a reference signal for estimating interference given to the wireless terminal because of the joint transmission.

(19) A wireless terminal including:

a wireless control section that estimates interference received because of joint transmission by using a reference signal supplied from any one of a plurality of wireless base stations that performs the joint transmission; and a communication section that transmits information regarding the estimated interference to another wireless base station.

REFERENCE SIGNS LIST

101 Master access point
102 Slave access point
108 to 109 Wireless terminal
203 OBSS access point
209 OBSS terminal
300 Wireless communication apparatus
310 Communication section
311 Wireless control section
312 Data processing section
313 Modulation/demodulation section
314 Signal processing section
315 Channel estimation section
316 Wireless interface section
317 Amplifier section
319 Antenna
321 Control section
322 Power source section
811 JT interference scan announcement
812 JT interference scan response
813 JT scan sector information
815 JT interference scan trigger
816 OBSS JT interference scan announcement
817 Trigger
818 JT interference scan
821 Estimation of the amount of interference
822 JT interference report trigger
823 JT interference report
824 JT interference feedback
826 Joint transmission setting determination
827 Joint transmission setting announcement
828 Joint transmission
831 JT interference scan trigger
832 JT interference scan
834 Channel Feedback
841 JT interference scan request
842 JT interference scan announcement

The invention claimed is:

1. A wireless communication control apparatus configured to control wireless communication of a first wireless base station, comprising:
   circuitry configured to:
      control a wireless communication circuitry of the first wireless base station to perform joint transmission with a second wireless base station;
      control the wireless communication circuitry to transmit a reference signal to at least one of a third wireless base station or a first wireless terminal, wherein
         the first wireless terminal receives the transmitted reference signal,
         the first wireless terminal estimates an amount of interference based on the received reference signal,
         the first wireless base station and the second wireless base station are associated with a first basic service set (BSS),
         the third wireless bases station and the first wireless terminal are associated with a second BSS different from the first BSS, and
         a coverage area of the first BSS overlaps with a coverage area of the second BSS;
      control the wireless communication circuitry to receive, from the third wireless base station, a result of the estimation of the amount of the interference,
      determine, based on the received result, a setting associated with the joint transmission; and
      control the wireless communication circuitry to transmit the setting to the second wireless base station.

2. The wireless communication control apparatus according to claim 1, wherein the circuitry is further configured control the wireless communication circuitry to transmit, to the third wireless base station, an inquiry to inquire that the estimation of the amount of the interference is prior to the transmission of the reference signal.

3. The wireless communication control apparatus according to claim 1, wherein the circuitry is further configured to:
   generate first information associated with precoding of the reference signal; and
   control the wireless communication circuitry to transmit the generated first information to the second wireless base station.

4. The wireless communication control apparatus according to claim 3, wherein the generated first information includes second information associated with a frequency of usage of the reference signal.

5. The wireless communication control apparatus according to claim 3, wherein the generated first information includes second information associated with a specific codebook of the second wireless base station.

6. The wireless communication control apparatus according to claim 3, wherein the generated first information includes second information associated with a weighting factor for the estimation of the amount of the interference.

7. The wireless communication control apparatus according to claim 3, wherein the generated first information includes information associated with a time offset for the second wireless base station at a time of the transmission of the reference signal.

8. The wireless communication control apparatus according to claim 7, wherein the generated first information includes at least one of
   third information that indicates one of a presence or an absence of the time offset, or
   fourth information that indicates the time offset.

9. The wireless communication control apparatus according to claim 1, wherein the circuitry is further configured to:
generate, prior to the transmission of the reference signal, information that indicates an implementation of the estimation of the amount of the interference; and
control the wireless communication circuitry to transmit the generated information to the third wireless base station.

10. The wireless communication control apparatus according to claim 9, wherein the generated information includes a time of the transmission of the reference signal, an implementation period of the estimation of the amount of the interference, and a frequency to implement the estimation of the amount of the interference.

11. The wireless communication control apparatus according to claim 1, wherein the circuitry is further configured to determine, based on the received result, a joint parameter that includes at least one of a joint transmission scheme, a precoding for the joint transmission, an encoding scheme, or a transmission power in the joint transmission.

12. The wireless communication control apparatus according to claim 11, wherein the circuitry is further configured to determine the joint parameter further based on specific criterion.

13. The wireless communication control apparatus according to claim 1, wherein
the reference signal includes information for estimation of a propagation path between the first wireless base station and a second wireless terminal connected to the first wireless base station,
the circuitry is further configured to control the wireless communication circuitry to transmit the reference signal to the second wireless terminal, and
the second wireless terminal is associated with the first BSS.

14. The wireless communication control apparatus according to claim 1, wherein
the determined setting includes information associated with a number of a plurality of joint wireless base stations,
the plurality of joint wireless base stations includes the second wireless base station,
the plurality of joint wireless base stations is different from the third wireless base station, and
the first wireless base station performs the joint transmission with the plurality of joint wireless base stations.

15. The wireless communication control apparatus according to claim 14, wherein
the setting further includes at least one of information associated with a joint transmission scheme in the joint transmission, information associated with a transmission antenna of the second wireless base station, information associated with a second wireless terminal, or information associated with a precoding of the second wireless terminal, and
the second wireless terminal corresponds to a destination of the joint transmission.

16. The wireless communication control apparatus according to claim 15, wherein
the information associated with the precoding of the second wireless terminal includes a number of a plurality of wireless terminals, identification information of the second wireless terminal, frequency information, an encoding scheme, transmission power, and a stream for the joint transmission,
each the plurality of wireless terminals corresponds to the destination of the joint transmission,
the plurality of wireless terminals includes the second wireless terminal, and
the first wireless terminal is different from the plurality of wireless terminals.

17. A wireless communication control apparatus configured to control wireless communication of a wireless base station, comprising:
circuitry configured to:
control a wireless communication circuitry of the wireless base station to receive, from a wireless terminal, information of interference with the wireless terminal, wherein
the wireless terminal estimates the interference based on a reference signal from one of a plurality of wireless base stations,
the plurality of wireless base stations performs joint transmission,
the interference is based on the joint transmission,
the plurality of wireless base stations is different from the wireless base station,
the plurality of wireless base stations is associated with a first basic service set (BSS),
the wireless base station and the wireless terminal are associated with a second (BSS) different from the first BSS, and
a coverage area of the first BSS overlaps with a coverage area of the second BSS;
generate overall interference information based on the received information; and
control the wireless communication circuitry to transmit the generated overall interference information to the one of the plurality of wireless base stations.

18. The wireless communication control apparatus according to claim 17, wherein the circuitry is further configured to control the wireless communication circuitry to transmit, to each of the plurality of wireless base stations, a request to transmit the reference signal.

19. A wireless communication control apparatus configured to control wireless communication of a wireless terminal, comprising:
circuitry configured to:
control a wireless communication circuitry of the wireless terminal to receive a reference signal from one of a plurality of wireless base stations, wherein the plurality of wireless base stations performs joint transmission;
estimate, based on the received reference signal, an amount of interference by the joint transmission; and
control the wireless communication circuitry to transmit, to a wireless base station, information that indicates the estimated amount of the interference, wherein
the plurality of wireless base stations is different from the wireless base station,
the plurality of wireless base stations is associated with a first basic service set (BSS),
the wireless base station and the wireless terminal are associated with a second (BSS) different from the first BSS, and
a coverage area of the first BSS overlaps with a coverage area of the second BSS.

* * * * *